(12) United States Patent
Galicki et al.

(10) Patent No.: US 6,982,976 B2
(45) Date of Patent: Jan. 3, 2006

(54) DATAPIPE ROUTING BRIDGE

(75) Inventors: Peter Galicki, Sugarland, TX (US); Cheryl S. Shepherd, Houston, TX (US); Jonathan H. Thorn, Gaithersburg, MD (US)

(73) Assignee: Texas Instruments Incorporated, Dallas, TX (US)

( * ) Notice: Subject to any disclaimer, the term of this patent is extended or adjusted under 35 U.S.C. 154(b) by 949 days.

(21) Appl. No.: 09/905,378

(22) Filed: Jul. 13, 2001

(65) Prior Publication Data

US 2002/0018470 A1 Feb. 14, 2002

Related U.S. Application Data

(60) Provisional application No. 60/224,607, filed on Aug. 11, 2000.

(51) Int. Cl.
*H04L 12/28* (2006.01)
*H04L 12/56* (2006.01)
*G06F 13/00* (2006.01)

(52) U.S. Cl. .................. 370/390; 370/410; 370/419; 370/432; 710/1

(58) Field of Classification Search .............. 370/392, 370/401, 402, 403, 389, 390, 410, 419, 432; 709/249; 710/1, 38
See application file for complete search history.

(56) References Cited

U.S. PATENT DOCUMENTS

| 4,328,578 A | * | 5/1982 | Bell et al. ............... 370/518 |
| 4,893,303 A | | 1/1990 | Nakamura et al. |
| 5,396,493 A | * | 3/1995 | Sugiyama ............... 370/403 |
| 5,469,432 A | * | 11/1995 | Gat ......................... 370/389 |
| 5,539,739 A | | 7/1996 | Dike et al. |
| 5,610,905 A | * | 3/1997 | Murthy et al. .......... 370/401 |
| 5,737,525 A | * | 4/1998 | Picazo et al. ........... 709/249 |
| 5,742,603 A | * | 4/1998 | Shafir et al. ............ 370/401 |
| 5,796,738 A | * | 8/1998 | Scott et al. ............. 370/401 |
| 5,892,923 A | | 4/1999 | Yasuda et al. |
| 5,983,269 A | * | 11/1999 | Mattson et al. ......... 709/221 |
| 6,233,242 B1 | * | 5/2001 | Mayer et al. ........... 370/412 |
| 6,564,277 B1 | * | 5/2003 | Keen et al. ............. 710/268 |

* cited by examiner

*Primary Examiner*—Hassan Kizou
*Assistant Examiner*—Ahmed Elallam
(74) *Attorney, Agent, or Firm*—Robert D. Marshall, Jr.; W. James Brady, III; Frederick J. Telecky, Jr.

(57) ABSTRACT

The datapipe routing bridge is composed of three building blocks, transmitter, bridge and receiver. The bridge component provides high levels of connectivity between multiple digital signal processors without paying the penalties usually associated with inter-processor connections. The individual digital signal processors are connected with unidirectional point-to-point links from a bridge terminal on one digital signal processor to a bridge terminal on another digital signal processor. A real-time comparison of the packet header information with direction identification codes (IDs) stored inside the bridge routes individual data transfer packets arriving at the bridge into the local processor, repeated out to the next processor or simultaneously absorbed and repeated.

17 Claims, 24 Drawing Sheets

FIG. 10

RESERVED FOR FUTURE USE

INITIALIZE TRANSMITTER REGISTER(S)

HALT EXECUTION OF BATCH OPCODES

RETURN FROM INTERRUPT SCRIPT TO BATCH SCRIPT

TRANSMIT DATA/RX_OPCODES EMBEDDED IN TX OPCODE

TRANSMIT A DATA BLOCK LOCATED ELSEWHERE IN I/O RAM r = RESERVED

TX OPCODE

BYTE 0

[r r r r | 0 | 0 | 0 | 0] RSV — 1020
[R SEL | H | 0 | 1 | 0 | 0] INITX — 1023, 1024
[ACTV | C | 1 | 1 | 0 | 0] HALT — 1030, 1034
[ACTV | CTRL | 0 | 1] RETIX — 1040, 1044, 1045
[ACTV | CTRL | 1 | 0] MSG — 1001, 1002, 1003
[ACTV | CTRL | 1 | 1] BLOCK — 1010

ACTIVE BYTES

RX_OPCODES OR DATA CONTENT

BYTES USED BY THE TX OPCODE

BYTE 3    BYTE 2    BYTE 1

1022  1021
REG DATA | REG DATA rsv | rsv rsv

TRANSFER PACKET CONTENT (RX OPCODE OR DATA)

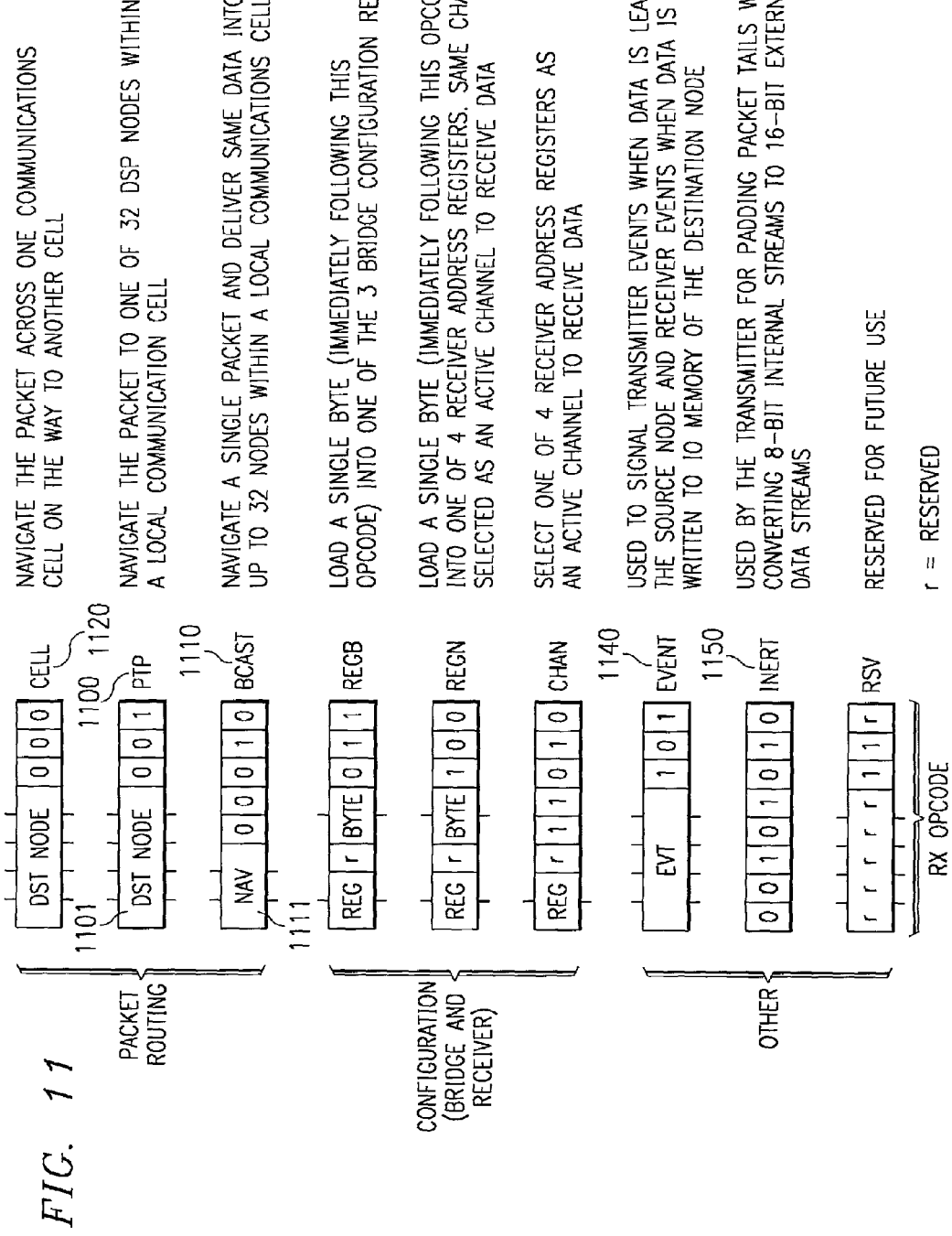

DATAPIPE ROUTING BRIDGE

CROSS REFERENCE TO RELATED APPLICATION

This application claims priority under 35 USC §119(e)(1) of Provisional Application No. 60/224,607, filed Aug. 11, 2000.

This application is related to the following copeding application:

U.S. Provisional Application No. 60/224,913 entitled PULL TRANSFERS AND TRANSFER RECEIPT CONFIRMATION IN A DATAPIPE ROUTING BRIDGE now U.S. patent application Ser. No. 09/905,379; and U.S. Provisional Application No. 60/224,586 entitled MULTIPROCESSOR NETWORK NODE FAILURE DETECTION AND RECOVERY now U.S. patent application Ser. No. 09/904,991.

TECHNICAL FIELD OF THE INVENTION

The technical field of this invention is data communication among a plurality of data processors.

BACKGROUND OF THE INVENTION

All current methods of inter-digital signal processor traffic management have a negative impact on the loading of the central processor unit (CPU) and the direct memory access (DMA) function. In addition there is a negative impact on the number of external pins/components and the complexity of operation. Conventional methods also have confining limits on the number of processors that can be connected together and the manner in which they may be connected together. The data streams used in current methods do not have means to carry control elements for transfer path reconfiguration ahead of the data packets, or for propagating a not ready signal up the stream to prevent data overruns. These limitations force the CPU/DMA and other chip resources to be actively involved in data traffic management at the cost of fewer cycles available to processing of data. The current methods also do not allow multiple digital signal processors to collectively receive the same data stream.

SUMMARY OF THE INVENTION

The datapipe routing bridge is the next generation inter-processor communications peripheral. It is composed of three building blocks, transmitter, bridge and receiver. The main function of the bridge component is to provide high levels of connectivity between multiple digital signal processors without paying the penalties usually associated with inter-processor connections. The individual digital signal processors are connected with unidirectional point-to-point links from a bridge terminal on one digital signal processor to a bridge terminal on another digital signal processor. Depending on the real-time comparison of the packet header information with direction identification codes (IDs) stored inside the bridge, individual data transfer packets arriving at the bridge of each digital signal processor along the way are autonomously absorbed into the local processor, repeated out to the next processor or simultaneously absorbed and repeated.

The bridge can function in three modes of operation, point-to-point mode, broadcast mode, and inter-cell mode. The inter-cell-mode allows communications between any number of digital signal processors in groups of 32 digital signal processors per group. The datapipe bus, carrying packet streams between the bridge components of multiple DSPs, has built-in signals for distinguishing between control and data elements on the bus, as well as a ready line that propagates against the flow of data to stop the flow upstream of a digital signal processor node that may be temporarily backing up. The datapipe routing bridge improves inter-digital signal processor traffic management over existing methods in following ways:

1. It eliminates external components and reduces the number of external pins dedicated to inter-processor communication, while at the same time it removes any limitations on the scope of communication, packet size and the types of connection topologies.

2. It hides the space/time complexity of moving large amounts of data between many nodes over a fixed number of links by autonomously performing all routing functions without involving the local CPUs or DMAs.

3. It removes any limits on how many processors can be connected together.

4. It removes any limits on how many digital signal processors can receive the same data stream as it flows around the datapipe network (broadcast/cell mode).

5. The capability of this new method to multiplex data and control elements on the same transfer links between digital signal processors, improves inter-processor traffic management, by the ability of control elements to configure or change the path for the data elements that follow. Previous methods had to use different mechanisms to transport control and data information, negatively impacting loading/synchronization or management of on-chip peripherals that could otherwise concentrate on processing the application.

6. The datapipe bus ready signal improves inter-processor traffic management by autonomously propagating a not ready condition against the flow of data, to manage congestion of some transfer link segments without involvement of any chip resources. This autonomous traffic management is better than the hands-on traffic management of previous methods, because it releases valuable chip resources from having to be involved in traffic management and instead allows them to fully concentrate of the application tasks at hand.

BRIEF DESCRIPTION OF THE DRAWINGS

These and other aspects of this invention are illustrated in the drawings, in which:

FIG. 10 illustrates the transmit opcode fields;

FIG. 11 illustrates the receive opcode fields;

DETAILED DESCRIPTION OF PREFERRED EMBODIMENTS

Figure 1:
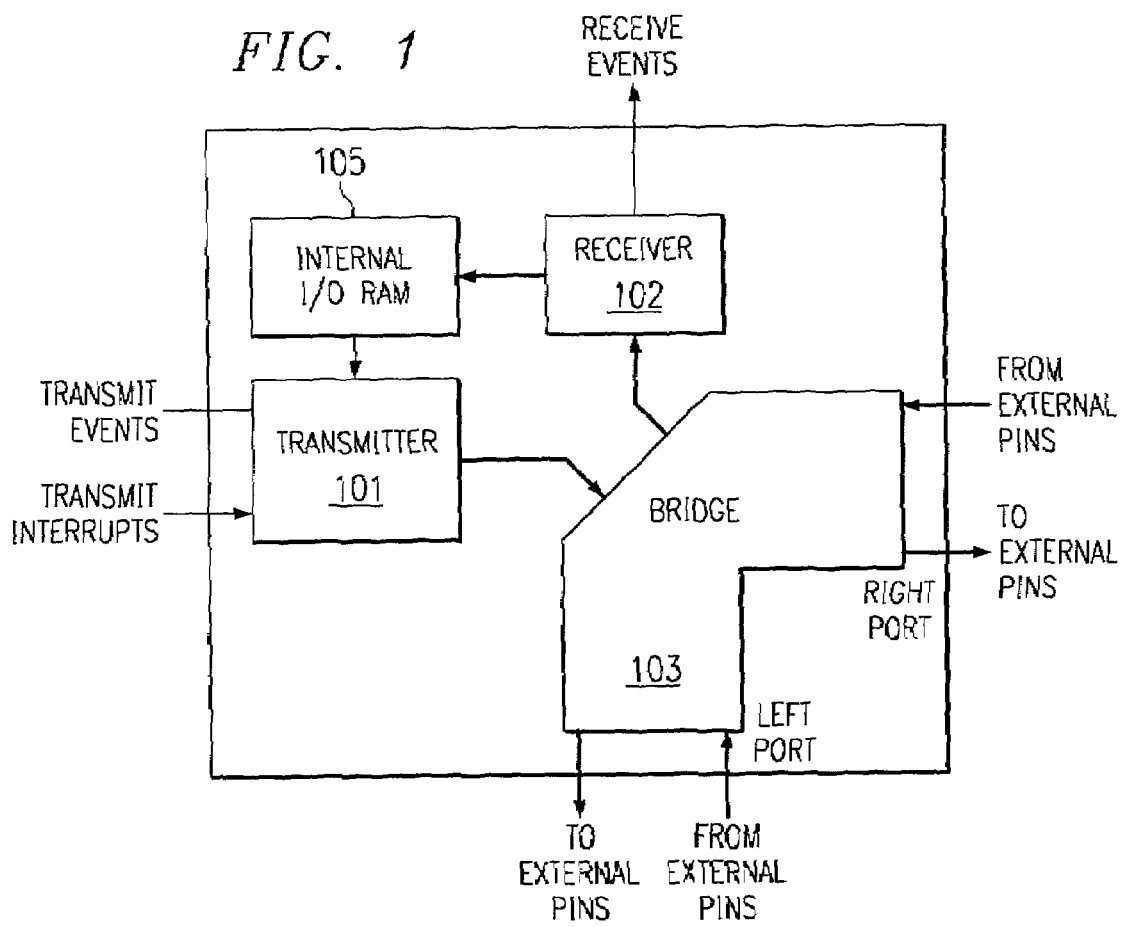
FIG. 1 illustrates the block diagram of a datapipe routing bridge peripheral.

This application uses the descriptive name datapipe routing bridge or simply datapipe to describe a packet based communications peripheral connecting multiple processors without glue logic or CPU intervention. FIG. 1 illustrates the makeup of a datapipe. It is composed of three building blocks transmitter 101, bridge 103 and receiver 102. The main function of the bridge component is to provide high levels of connectivity between multiple digital signal processors without paying the penalties usually associated with inter-processor connections. Dedicated routing logic within the datapipe autonomously navigates data packets of programmable size along the shortest distance from the source processor to one or more destination processors. Transmitter 101 may transmit data packets via bridge 103 to one or both of the right and left ports. Transmitter 101 responds to transmit events and transmit interrupts from an associated data processor (not shown) to supply data from internal I/O memory 105 to bridge 103. Bridge 103 is capable of retransmitting a data packet received at one of the right or left ports to the other port. Bridge 103 may also transfer a received data packet to receiver 102 in addition to or instead of retransmission at the other port. The actions of bridge 103 are determined by a header of the data packet. Upon receipt of a data packet, receiver stores the received data in internal I/O memory 105 and may generate a receive event to the associated data processor. In the preferred embodiment the associated data processor is a digital signal processor.

Figure 2:
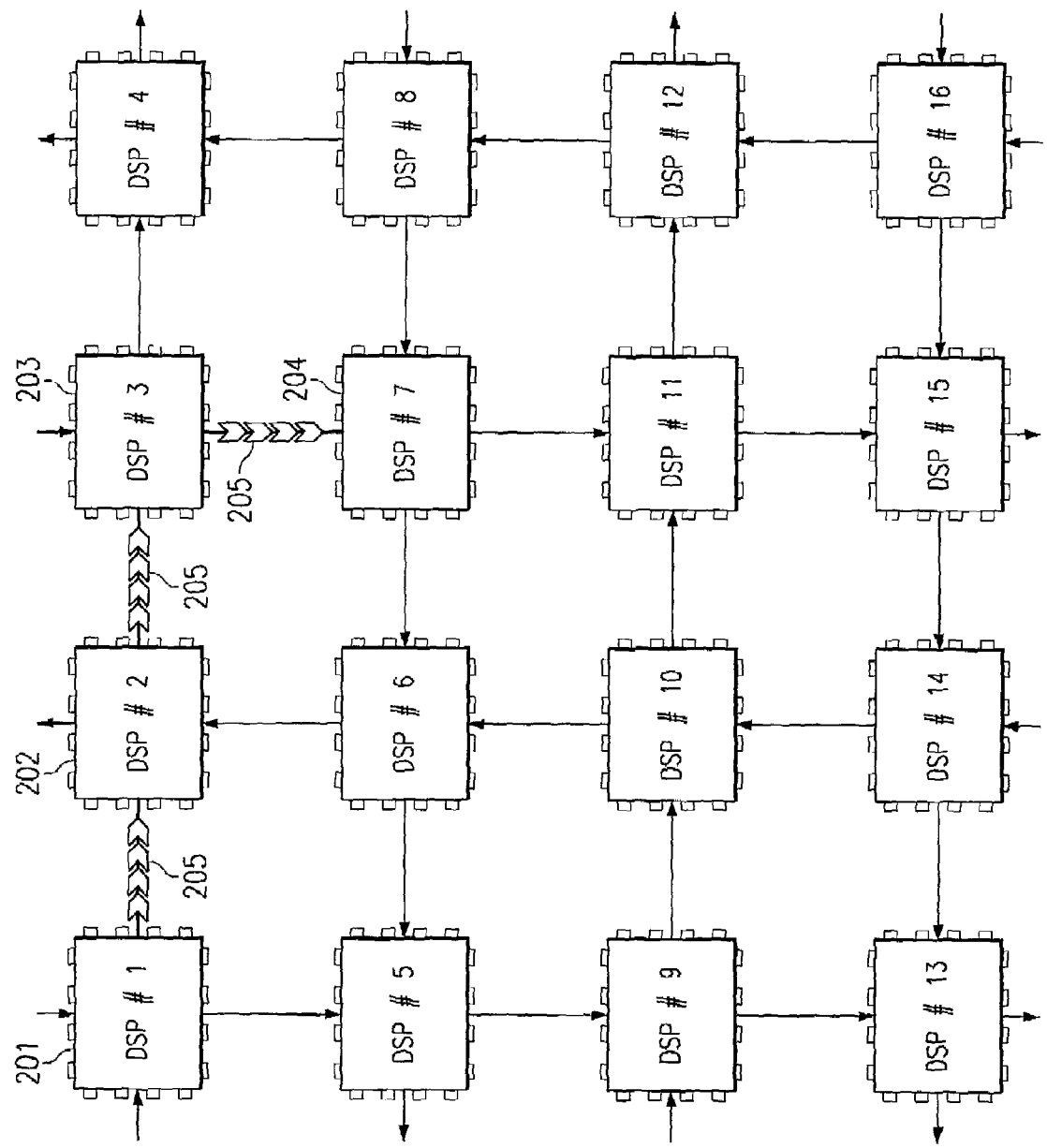
FIG. 2 illustrates an array of multiple processors connected in a datapipe network.

FIG. 2 illustrates an array of multiple digital signal processors connected in a datapipe network. Each intermediate processor 202 and 203, between source processor 201 and destination processor 204 repeats the packet to the next processor through dedicated point-to-point uni-directional links 205. Each link contains a 16-bit data bus, its own transfer clock and a ready signal. The links 205 also contain a 2-bit control signal identifying the data content (at the rising edge of the transfer clock) as a packet body or a control opcode used by the datapipe routing logic to navigate the packet to its destination.

As illustrated in FIG. 2, the 2-dimensional communications grid implemented with the datapipe has a single input or output link (not both) on each of the 4 edges of each digital signal processor node. Other solutions that do not have the programmable packet routing capability of the datapipe may require and "in" and "out" channels on each edge to function in a two dimensional grid arrangement. Single direction per edge (one way street) is possible because of the following two datapipe features:

1. Every datapipe bridge in the system is aware of the exact relative location of every other datapipe node in that system.

2. The ability of each bridge to use feature 1 to make multiple turns to approach the destination from only two edges instead of 4 edges in case of a 2-way street.

The feature is a key to datapipe efficiency. The combined routing knowledge of the packet combined with the knowledge of each node where the other nodes are, can force the packet to take the extra turns through the system to approach the destination from only 2 edges instead of 4 edges.

In FIG. 2 those edges are up and left (or down and right, depending on the node) and if the packet were to continue past node seven to node 6 it would autonomously be forced by node 7 to make another right turn to approach node 6 from it's right edge. Datapipe routing is designed to reduce the number of input pins by half by not requiring input channels on the left and up edges of node 6. Conventional methods need inputs on all four edges of each node to implement orthogonal grid communications, because they can not autonomously make multiple turns to approach the destination node from just two edges.

Figure 3:
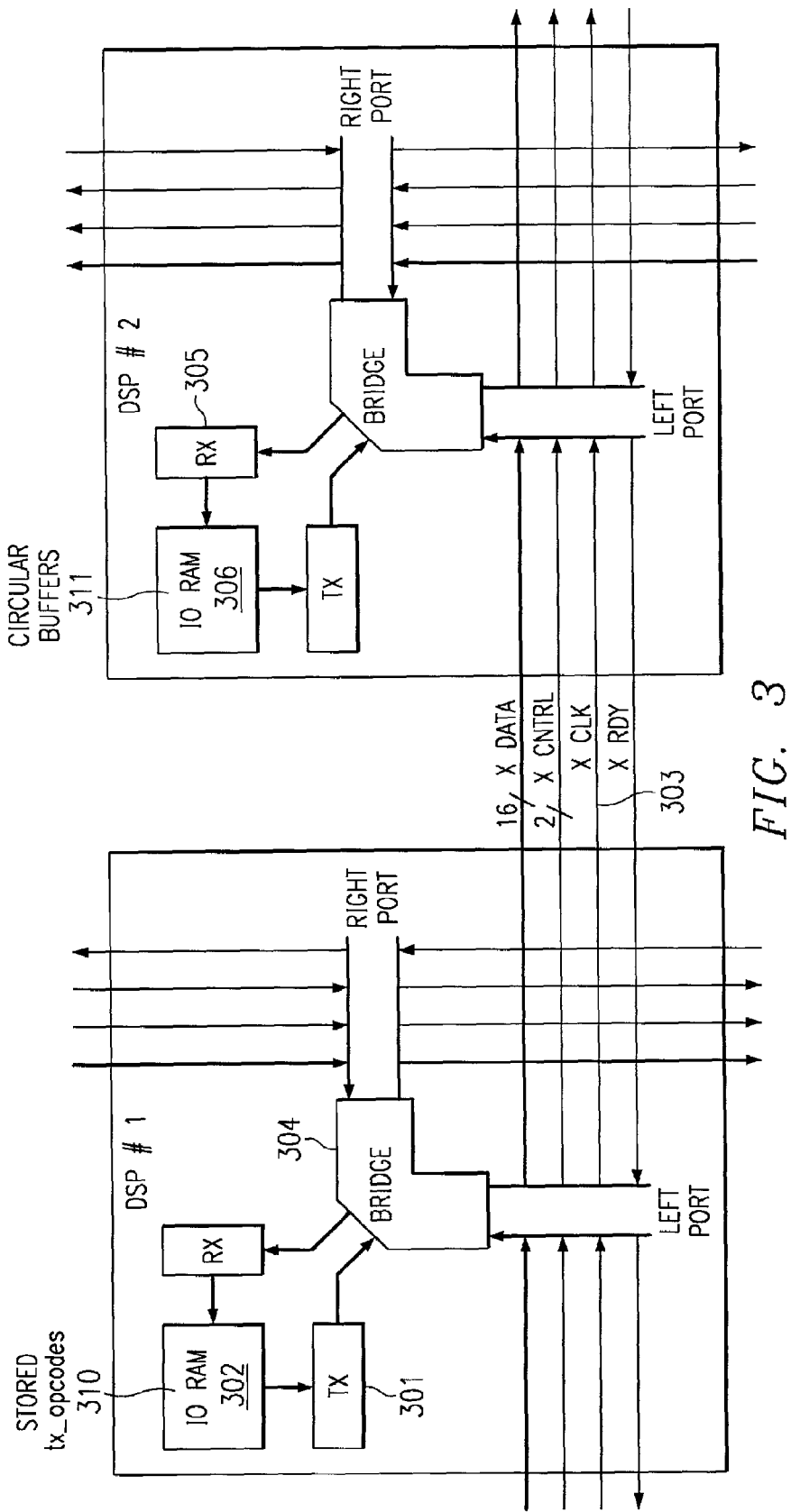
FIG. 3 illustrates a single communications link between two digital signal processors using a datapipe routing bridge peripheral.

FIG. 3 illustrates the three components of the datapipe hardware at each terminal node and their connection to the datapipe network in an example data transfer. The transmit controller 301 drives the packets from internal I/O RAM 302 out lines 303 to the links connecting the digital signal processors. The communications bridge 304 -routes each packet into or around each digital signal processor node on the network. For each packet routed into a node from the network, the receive unit 305 pushes the packet into the local I/O RAM 306 of the destination digital signal processor. Both of the two external ports of the bridge feature two unidirectional channels, one for input and one for output. Both transmitter and receiver can send communications events to the interrupt selectors in the associated digital signal processor. The transmitter can also respond to interrupts from the interrupt selector. The receiver can also send an interrupt directly to the transmitter.

The datapipe uses internal I/O RAM 306 for temporary storage of outgoing data and for buffering of the incoming data. The datapipe transmitter 301 uses the internal I/O RAM 302 to store $tx_{13}$ opcodes 310 instructing it what blocks to transfer and their locations within internal I/O RAM 302. The datapipe receiver deposits incoming packets into dedicated internal I/O RAM 306 circular buffers 311.

Figure 4:
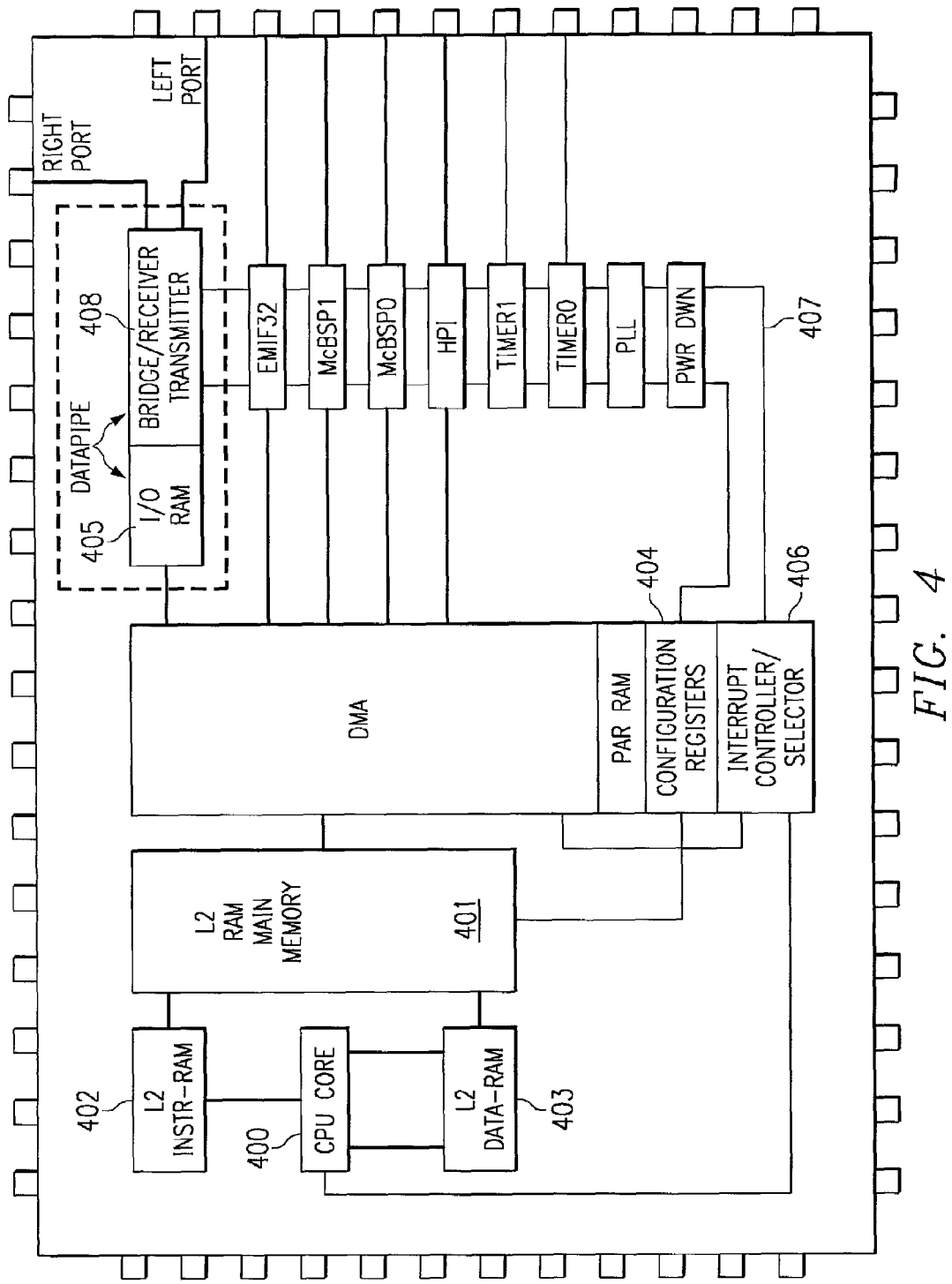
FIG. 4 illustrates the a datapipe routing bridge peripheral within a conventional digital signal processor chip.

FIG. 4 illustrates the datapipe within a conventional digital signal processor integrated circuit. Internal I/O RAM input buffers 405, when almost full, send an event to the chip direct memory access (DMA) unit to move the data into the level-2 (L2) main memory 401, where it can be accessed directly by the central processing unit core 400. Note that this application contemplates that central processing unit core 400 is a digital signal processor, however this invention is equally applicable to a general purpose data processor. Internal I/O RAM 405 of the datapipe is split into two independent blocks for simultaneous direct memory access unit and datapipe access. The direct memory access port servicing internal I/O RAM 405 and the datapipe looks exactly like the other direct memory access ports driving the remaining chip peripherals. FIG. 4 further illustrates conventional features of a digital signal processor including L2 instruction RAM 402, L2 data RAM 403, parameter RAM (PAR RAM), power down circuit (PWR DWN), phase locked loop circuit (PLL), first and second timers (TIMER0, TIMER1), a host port interface (HPI), two multi-channel buffered serial ports (McBSP0 and McBSP1) and a 32-bit external memory interface (EMIF32).

Collecting small amounts of I/O data outside of L2 memory and bringing it into L2 in larger blocks, increases direct memory access efficiency and decreases the probability of central processing unit/direct memory access conflicts inside the L2. The datapipe configuration registers 404 and interrupt registers 406 are memory mapped in the configuration space. The datapipe receiver and transmitter events are carried by a bus 407 to the interrupt registers 406, where some of the same receiver events can be bounced back to the transmitter in the form of datapipe transmit interrupts.

The datapipe interrupt flag/enable registers which are a part of the digital signal processor interrupt selector/controller 406 and the datapipe configuration registers 404 are memory mapped in the configuration bus space. Each digital signal processor with one datapipe peripheral has two receive channels and two transmit channels. One receive channel on processor A connects to one transmit channel of processor B, and conversely the second transmit channel on processor B connects to the second receive channel of processor A.

The datapipe is a general purpose inter-processor communication peripheral supporting most common communication protocols. Because of its fully programmable functionality involving routing method, packet size, and total number of nodes organized in cells, the datapipe can be easily adapted to less common communication approaches and still not require glue logic or CPU intervention. It has a fully scalable architecture, which makes it possible to add or remove processors without any changes in system hardware or software drivers. The following features make the datapipe adaptable to a wide spectrum of digital signal processor applications:

Point-to-point transfers;
Broadcast transfers;
Unlimited node count;
Hardware routing requires no reliance on CPU to transfer data;
Zero-glue logic connections between processing nodes;
Up to 800 Mbytes/s transfer rates;
Programmable transfer control;
Programmable packet size;
Programming interface through tables in memory;
Supports linear, orthogonal mesh and tree topologies;
Receiver sends data receipt confirmation to the sender;
Data log for transmitted data receipts;
Data log for received data;
Scalable architecture; and
Supports both expected and unexpected transfers.

Each digital signal processor with one datapipe peripheral has two receive channels and two transmit channels. The receive channel on one processor connects to the transmit channel of another, and vice-versa as already described in FIG. 3. While the orthogonal grid topology maps well into a typical two-dimensional circuit board, the individual receive and transmit channels can be connected in linear, tree or custom arrangements that best fit the application. Even after the processors on the board have been hard-wired into a specific connection topology, the logical ports can still be reprogrammed in software to a different subset topology without changing the hardware.

Figure 5:
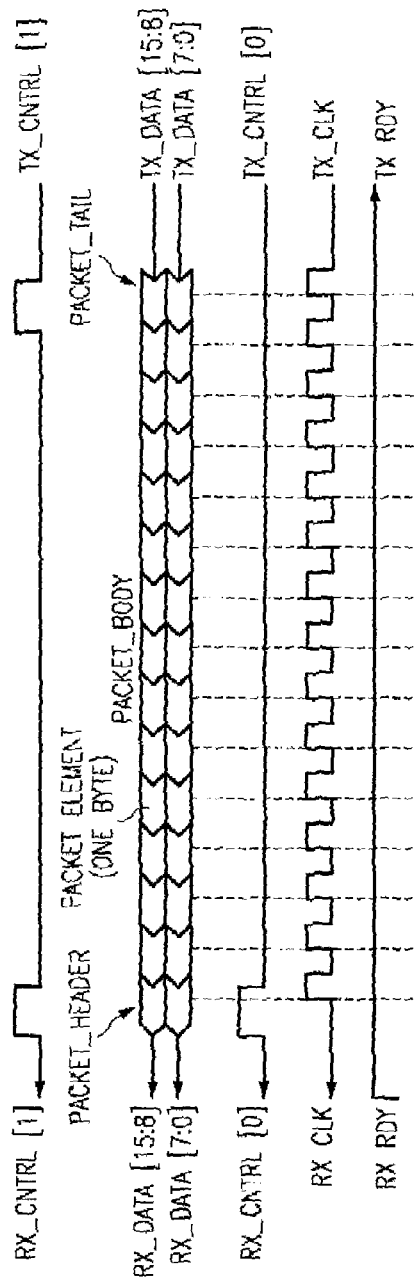
FIG. 5 illustrates the timing diagram of a packet transfer when the-destination is always ready to receive.

FIG. 5 illustrates the signals and timing of a data transfer. A typical transfer starts at the source digital signal processor where a packet is injected into the datapipe network through one of transmit channels. The header preceding the packet content contains information about one or multiple destinations for the packet. As it enters each node, the header is processed with the local identification ID registers inside the datapipe bridge. The bridge left and bridge right ID registers have knowledge of the location of all other processors within a 32-processor communications cell. The packet may be accepted into the node, routed back out through the left or right port, whichever is closer to the destination encoded in the header, or both accepted into the node and routed to the port. Broadcast packets can navigate to multiple destinations.

A single unidirectional channel between any two processors contains a 16-bit data bus, two control signals, a transfer clock and a ready signal. The dedicated transfer clocks, operating at half the frequency of the internal datapipe logic, make it possible to connect multiple digital signal processor nodes without any external logic, even if all digital signal processors are clocked by unsynchronized clock sources running at different frequencies.

A 16-bit data bus in each channel represents two byte-wide transfer units. Each transfer byte can represent data or a receive control opcode, as designated by the corresponding control signal. At each rising edge of the transfer clock, a low TX_CNTRL[0] signal designates the TX_DATA[7:0] signals as packet data content, while a high TX_CNTRL[0] signal designates the same TX_DATA[7:0] signals as rx_opcodes. Similarly, the TX_CNTRL[1] signal designates the TX_DATA[15:8] signals as data content or rx_opcodes. The rx_opcodes are typically located in front of the data content (header) or immediately following the data (tail). The rx_opcodes typically contain information that the bridge routing logic needs to navigate the packet to its destination. Other rx_opcodes may be used for bridge and receiver initialization, receive channel selection and to recognize boundaries between consecutive packets. The ready signal, originating at the receive side of each channel, propagates in the direction opposite to the flow of data. A high ready signal indicates that the receiver is ready to absorb any data that may be going its way. A low ready signal, indicating a backed-up receiver, directs the transmitter on the opposite side of the channel to suspend sending data within a certain number of cycles.

Figure 6:
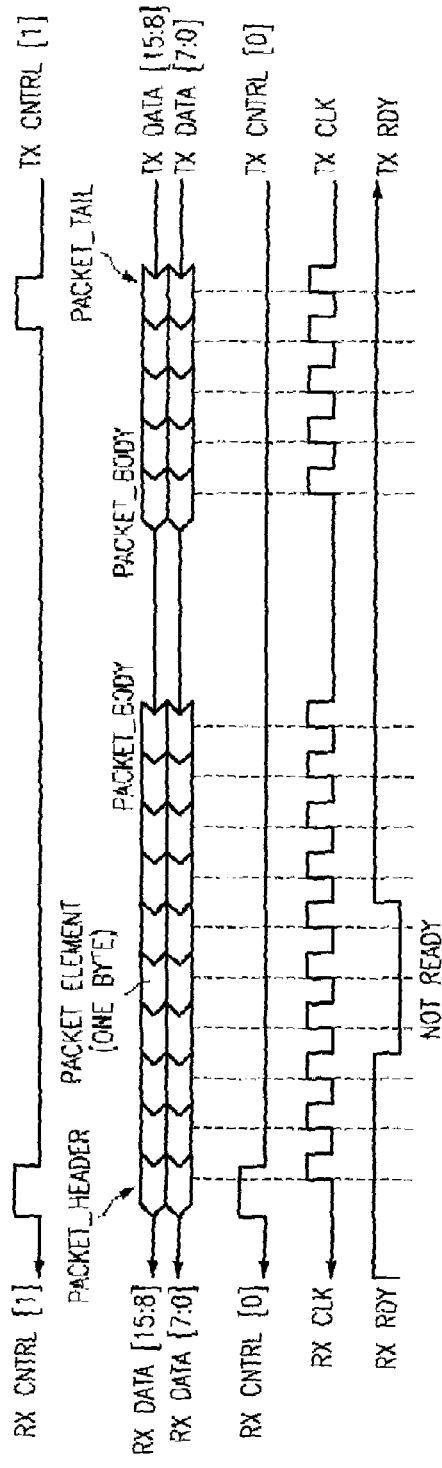
FIG. 6 illustrates the timing diagram of a packet transfer when the destination is not ready to receive.

FIG. 6 illustrates the timing diagram of a packet transfer when the destination is not ready to receive data. A continuous not ready state will cause the not ready signal to propagate up the data stream, gradually halting additional nodes in an orderly fashion and without any loss of data. The transfer clock is active only when there is valid data on the data lines. In case of a low ready signal, or when the transmitter has no data to transfer, the transfer clock is deactivated in a low state to conserve power and to reduce noise.

Figure 7:
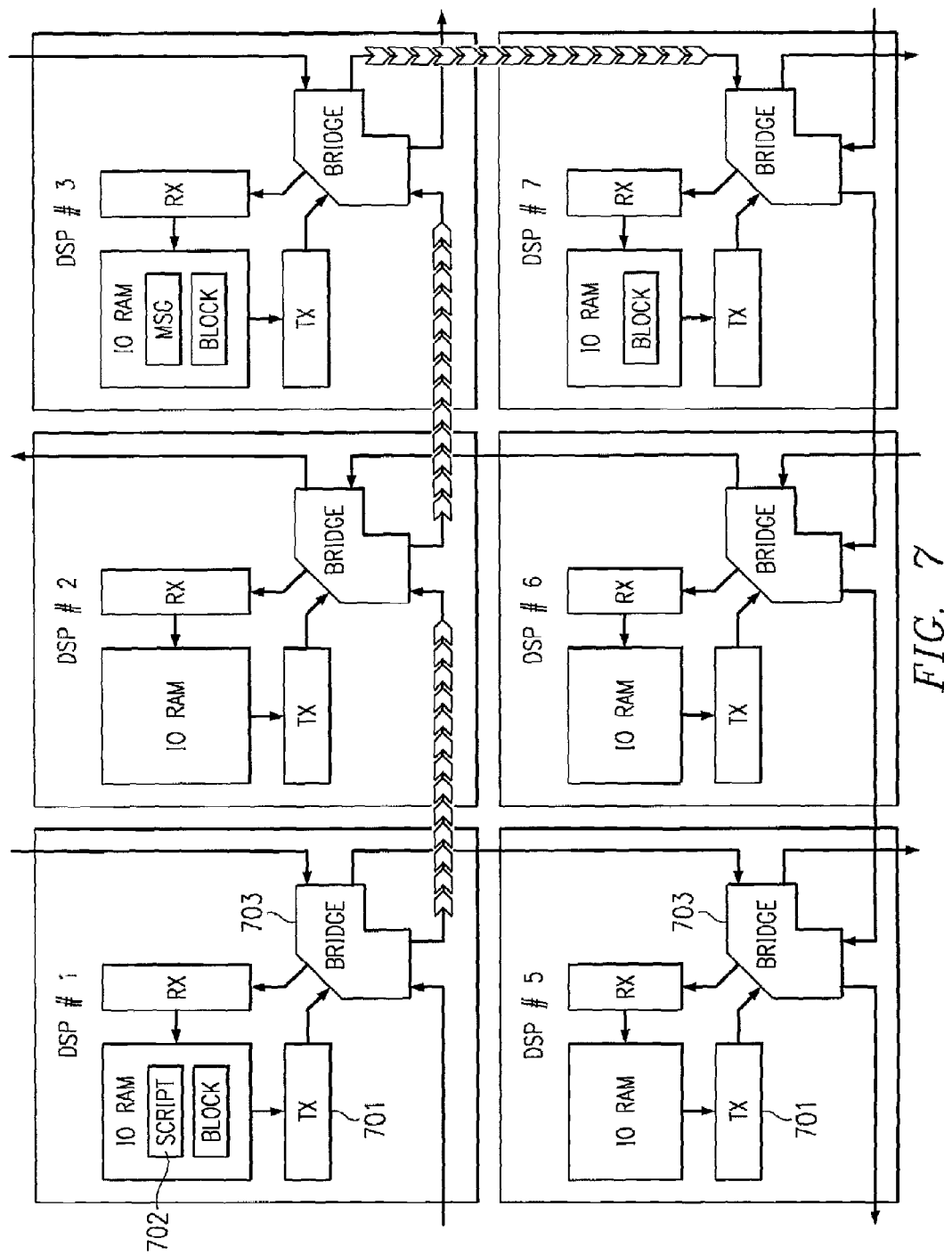
FIG. 7 illustrates packet transfer flow between one source and two destinations.

FIG. 7 illustrates packet transfer flow between one source and two destinations. Each transfer starts by the transmitter 701 fetching a 32-bit tx_opcode from a transmit script 702 inside an I/O RAM and interpreting the encoded transfer similarly to a CPU interpreting an instruction to operate on data. Rather than operating on data, the transmitter script sends data to another digital signal processor across the local bridge 703 and through the datapipe network. There are two ways that a tx_opcode can cause a data packet to be injected into the datapipe network. These are: a MSG tx_opcode contains embedded data; or a BLOCK tx_opcode pulls the data from a location in I/O memory separate from that which holds the tx_opcodes.

The use of the MSG tx_opcode is similar to having an immediate operand embedded inside a processor instruction. The data that the instruction operates on is a part of the instruction-data that the MSG tx_opcode transmits.

The use of the BLOCK tx_opcode is similar to an indirect addressing mode using the same processor analogy. The data that the BLOCK tx_opcode transmits has its address embedded inside the BLOCK tx_opcode, but the data itself is residing in a different area of memory. A BLOCK tx_opcode causes the transmitter to transfer a block of data from a different local I/O RAM location, whose address has been previously loaded into the transmitter address register with other tx_opcodes preceding the BLOCK tx_opcode.

Regardless of how each packet was injected into the datapipe network by the transmitter, the packet header guides it across the network to one or more destination nodes. For example a short point-to-point packet sourced by a MSG tx_opcode could travel across only one intermediate node arriving at one and final destination node. The longer packet with a broadcast header, launched from the same node by the BLOCK tx_opcode, can also make its first delivery after one intermediate node. But instead of stopping there, it could go on to deposit the same block of data for the second time in another node on the datapipe network.

Figure 8:
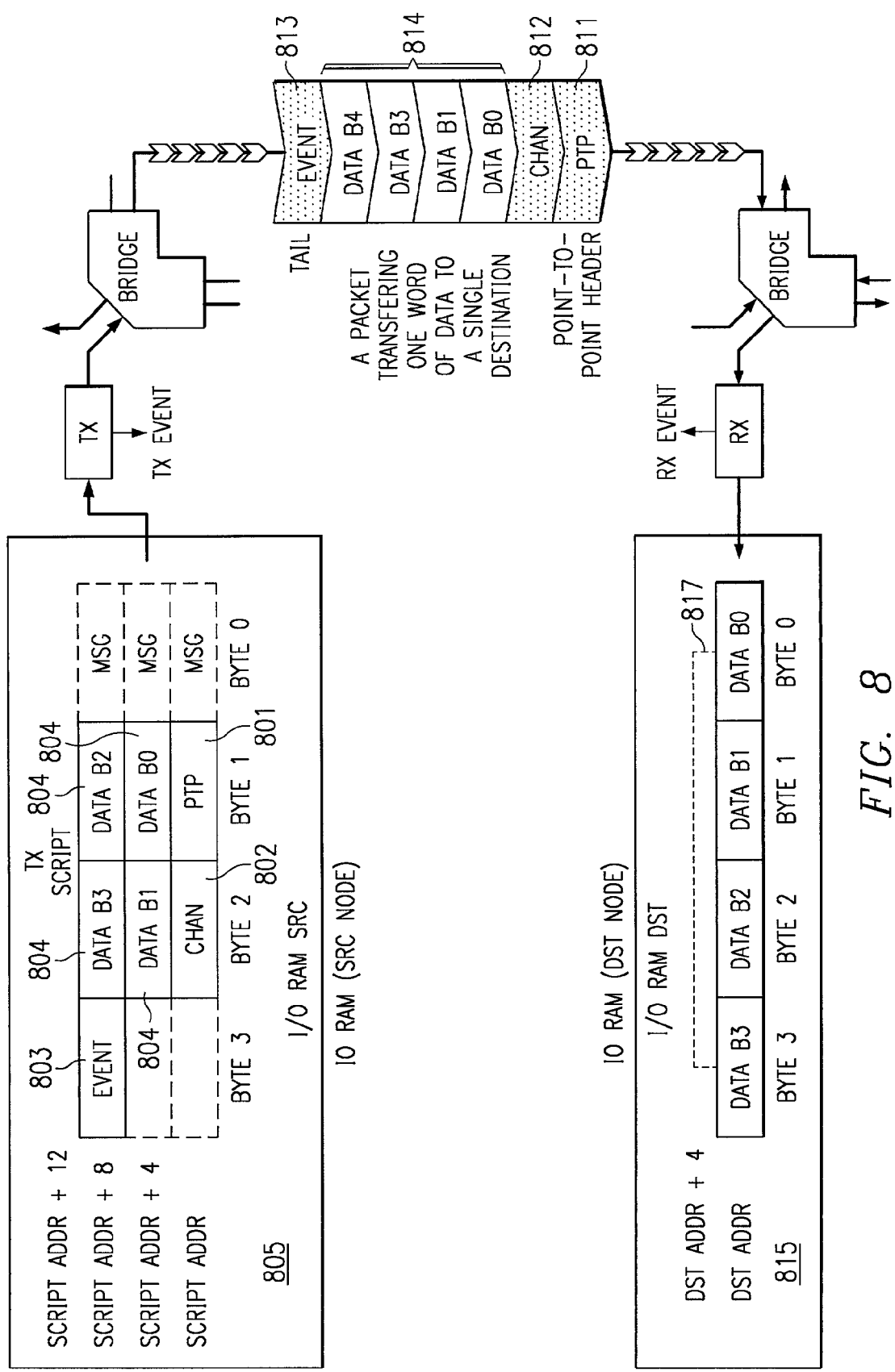
FIG. 8 illustrates an example of a message transfer.

FIG. 8 illustrates an example of a message transfer. The message (MSG) tx_opcode injects data bytes embedded inside the tx_opcode directly into the datapipe network. For example, the first MSG opcode inside a tx_script could contain two packet header rx_opcodes, PTP 801 and CHAN 802. The PTP 801 rx_opcode guides the packet to a single (point-to-point) destination and then causes the packet to enter that node through the local receiver. The CHAN 802 rx_opcode guides the receiver to deposit the packet contents into one of several currently active memory locations inside the destination DST I/O RAM 815. Back on the transmitter side, the second and third MSG tx_opcodes could hold the packet body 804, which is four bytes in this example. The third MSG tx_opcode could also hold the EVENT rx_opcode 803, used by the routing hardware to detect boundaries between packets and to trigger stream events. To summarize the message transfer, the three 32-bit MSG tx_opcodes cause the transmitter to source a 7-byte packet into the datapipe network, consisting of two header rx_opcodes 811 and 812, four bytes of data content 814, followed by a single tail rx_opcode 813. Upon arrival at the destination node, the three rx_opcode bytes 811, 812 and 813 are stripped off, leaving only the word-wide data content 814 to be written into the destination DST I/O RAM 815 at the current location 817 within the designated channel.

Figure 9:
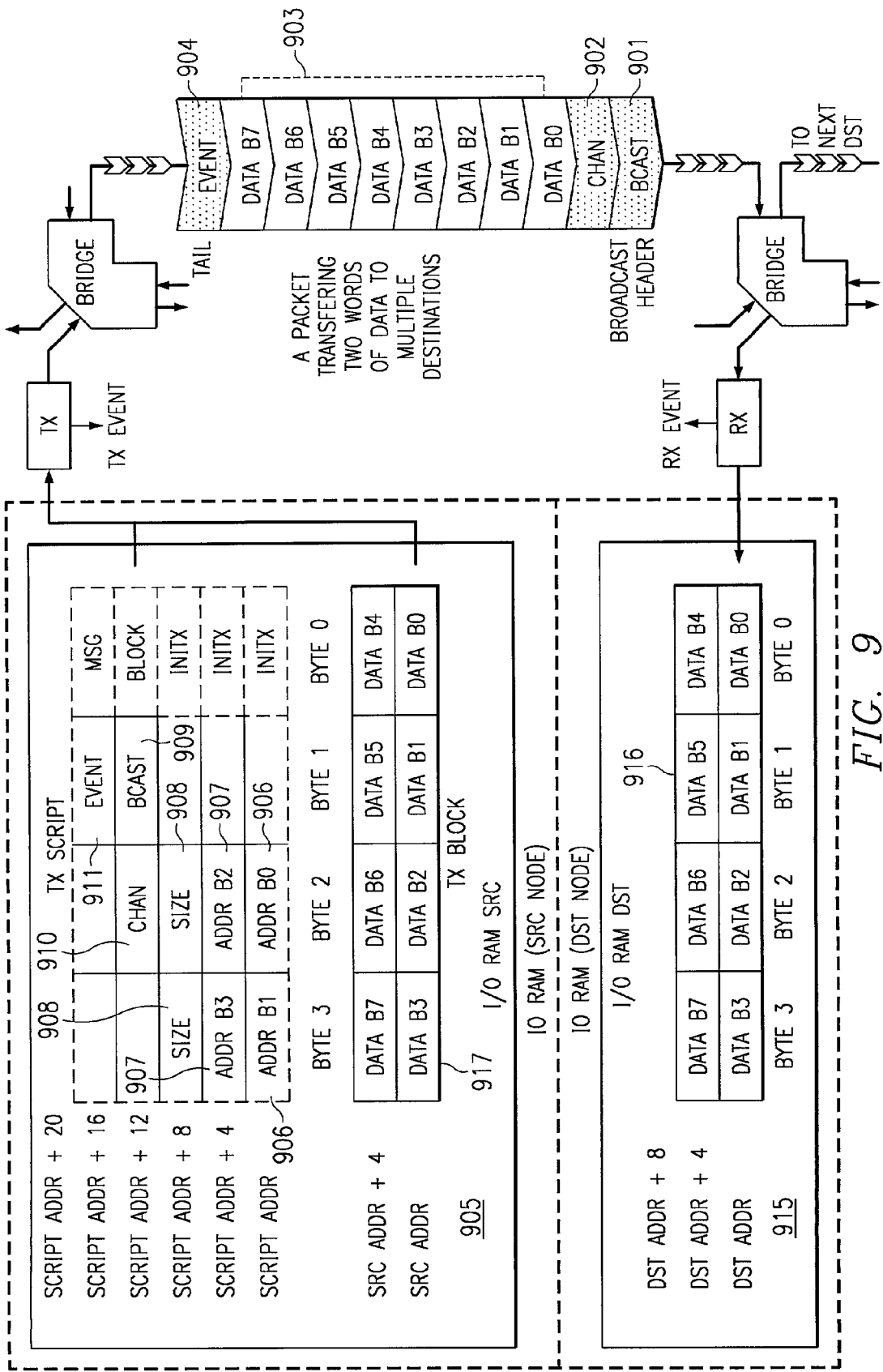
FIG. 9 illustrates an example of a block transfer.

FIG. 9 illustrates an example of a block transfer. Just like the MSG tx_opcode, the BLOCK tx_opcode can inject control bytes embedded inside the tx_opcode directly into the datapipe network. In addition, the BLOCK tx_opcode also initiates a data block transfer from another location within the source I/O RAM 905. The start address and block size are loaded into the transmitter registers by another tx_opcode INITX, prior to execution of the BLOCK tx_opcode. For example the first INITX tx_opcode could load the bottom half-word of the block starting address 906, the second INITX tx_opcode could load the top half-word of the same address 907, and the third INITX tx_opcode could load the 16-bit transfer size 908 (in bytes) into a transmitter size register. The next tx_opcode inside a tx_script could contain two packet header rx_opcodes, BCAST 909 and CHAN 910. In this case, the BCAST 909 rx_opcode guides the packet to two (broadcast) destinations, causing the same packet to enter both nodes through their local receivers. The CHAN 902 rx_opcode guides the receiver to deposit the packet contents into one of several currently active memory locations 916 inside the destination DST I/O RAM 915. Back on the transmitter side, the fifth tx_opcode could be a MSG rx_opcode, containing the EVENT rx_opcode 911, used by the routing hardware to detect boundaries between packets and to trigger stream events.

To summarize the block transfer, the five 32-bit tx_opcodes (INITX, INITX, INITX, BLOCK and MSG) fetched from the tx_script, caused the transmitter to source an 11-byte packet into the datapipe network, consisting of two header rx_opcodes, eight bytes of data content followed by a single tail rx_opcode. Upon arrival at each of the two destination nodes, the three rx_opcode bytes BOAST 901, CHAN 902, and EVENT 904 were stripped off, leaving only the double word wide data content 903 to be written into the destination I/O RAM 915 at the current location 916 within the designated receive channels. Note, that the packet body for this transfer was not embedded inside the tx_script as in the previous (MSG) example, but instead was sourced from a separate, dedicated data location within source I/O 905 RAM of the transmitting node.

Because all packet routing is done in software configurable hardware, the user has a complete control of all aspects of every transfer, starting with the transmission of the source node, followed by routing through the intermediate nodes, and ending with the entry of the packet into one or more destination nodes. All transfer control is accomplished with two types of transfer opcodes, the tx_opcodes and rx_opcodes.

As seen in the above two examples, the transmitter at each node traverses the tx_script located in its local I/O RAM to get instructions (32-bit tx_opcodes) on what data to transfer out and how to wrap it with 8-bit rx_opcodes to ensure that the packets efficiently navigate towards their destination nodes, and then are loaded into the right location within the receiving I/O RAM. While the transmitter is using tx_opcodes to inject packets into the datapipe network, both the bridge and the receiver are driven by the rx_opcodes embedded within the packets and identified by high rx_cntrl signals. Before the rx_opcodes show up on the datapipe network, they first exist within the tx_opcodes inside the tx_script.

The tx_script is the sole method for the user to set-up and control all transfers. The tx_script is a contiguous sequence of 32-bit tx_opcodes whose main purpose is to spawn packets of data, wrapped with 8-bit rx_opcodes to navigate the packets to their destinations and to signal the destination CPU of their arrival. Setting up the tx_script inside the I/O RAM of each transmitting digital signal processor node is the only thing that the application needs to do to accomplish all transfers. In the preferred embodiment all tx_scripts are currently composed from only five unique 32-bit tx_opcodes, each of which may contain data and one or more of the seven currently supported 8-bit rx_opcodes.

All transfers are as simple as placing the data blocks in the I/O RAM, setting up the tx_script to instruct the transmitter what to do with that data, and finally accessing the data in response to a stream interrupt after it arrives at the destination node. No further application involvement, beyond this memory level, is needed or supported by the datapipe software configurable hardware.

FIG. 10 illustrates the transmit opcode fields. The datapipe transmitter fetches tx_opcodes from a tx_script to spawn data packets, initialize its own registers, halt itself and to return from unexpected transfers (unxp and rcpt tx_scripts) back to its main batch tx_script.

The MSG rx_cntrl 1001 injects individual rx_opcodes or data bytes, embedded inside the MSG word, into the datapipe network. The three high bytes of the MSG instruction can be used to transmit any combination rx_opcodes or data bytes, always starting with the lowest byte first. The live rx_opcodes or data bytes inside the MSG rx_cntrl are identified by the corresponding high bits inside the ACTV field, according to the same order (low bit describes the low byte, etc). The 3-bit CNTRL field 1002 describes the live bytes identified in the ACTV field 1003 as rx_opcodes (high) or data content (low), in the same order as the ACTV bits 1003.

Just like the MSG rx_cntrl, the BLOCK rx_cntrl 1010 can inject individual rx_opcodes or data bytes, embedded inside the BLOCK word, into the datapipe network. The main function of the BLOCK rx_cntrl however is to transmit a separate block of data that is located in a different portion of the I/O RAM than the tx_script holding the BLOCK rx_cntrl. Before the BLOCK rx_cntrl can trigger a block transfer, two transmitter registers must be first loaded with the INITX tx_opcodes 1020, one representing the starting address of the block and the other the block size in bytes.

The INITX rx_cntrl 1020 initializes transmitter registers, one half of a register at a time. The register content data is located in the upper two bytes 1021/1022 of the INITX opcode. The high H bit 1023 identifies the data as the upper half-word and the low H bit identifies the data as the lower half-word of the register being initialized. The RSEL field 1024 identifies the target register.

Typically, the transmitter has to be halted when all of the data in the current application frame has been transmitted out, but the new frame has not yet begun. The HALT rx_cntrl 1030 stops the transmitter from executing any more tx_opcodes following the HALT, by deasserting the TX_ENB bit in a datapipe configuration/status register. The CPU may re-enable the transmitter by setting that bit back to a logical 1 with a configuration bus write cycle. The three high bytes of the HALT rx_cntrl 1030 may be used to hold up to three rx_opcodes, for example, to notify the transmitting node and the receiving nodes (with stream interrupts) that this transmitter has been halted. This could be done with a combination of EVENT and MSG rx_opcodes. The live rx_opcodes inside the HALT rx_cntrl are identified by the three corresponding bits inside the ACTV field 1034, according to the same order.

In addition to the main batch tx_script representing expected data (that repeats during every frame), the transmitter has to be able to respond to unexpected-transfer requests, to quickly transmit a control message or to automatically send out a transfer arrived confirmation receipt back to the sender. The unexpected transfers are loaded into the unxp and rcpt tx_scripts and are triggered by the associated interrupts. Upon receiving an unexpected transfer request interrupt, the transmitter will continue sending out the current batch packet until the next packet boundary, at which time it switches from processing the batch tx_script to the unxp or rcpt tx_script. Each unexpected rx_script should always end with the RETIX rx_cntrl 1040, which causes the transmitter to return to processing the batch tx_script after the unexpected transfer has been sent out. This is analogous to a CPU executing an interrupt service routine and returning to the main code with a return from interrupt instruction. The three high bytes of the RETIX instruction can be used to transmit any combination rx_opcodes or data bytes, always starting with the lowest byte first. The live rx_opcodes or data bytes inside the RETIX rx_cntrl are identified by the corresponding high bits inside the ACTV field 1044, according to the same order (low bit describes the low byte, etc). The 3-bit CNTRL field 1045 describes the live bytes identified in the ACTV field as rx_opcodes (high) or data content (low), in the same order as the ACTV bits.

FIG. 11 illustrates the receive opcode fields. Each data transfer packet contains data content, which is the body of the packet and a few rx_opcodes that guide the data through the datapipe network to its destination. In addition to this routing function, the rx_opcodes are also used for initialization and run time configuration of the two out of three datapipe components, bridge 103 and receiver 102. Note that transmitter 101 is initialized/configured by tx_opcodes. Other rx_opcode functions include setting off stream events in the transmitter and receiver and performing some housekeeping tasks that are normally not visible at the application level. An example is expediting packet tails when packing 8-bit internal routing streams into 16-bit external transfer streams. The rx_opcodes are typically located in front of the data (packet header) or immediately following the data (packet tail).

There are three different packet routing protocols that the datapipe bridge uses to navigate transfer packets to their destination(s). Each routing scheme is represented by a different rx_opcode in the packet header. When first entering the bridge, the packet header is immediately evaluated to identify which of the three routing methods should be applied to the incoming packet.

The PTP rx_opcode 1100 represents a point-to-point transfer, where one node sources a packet to only one destination node. The 5-bit DST_NODE field 1101 of the PTP rx_opcode contains a specific node address of the destination node identifying one of 32 possible locations within the local communications cell. During point-to-point transfers, each intermediate node between the source and the destination repeats the packet back out, until it gets to the destination node where it is absorbed into that node and not repeated out again.

The BCAST rx_opcode 1110 represents a broadcast transfer, where one node sources a packet to one or multiple destination nodes. The 3-bit NAV field 1111 inside the rx_opcode represents three directions for the packet to take when leaving the bridge component. The three bits represent (from low to high) the left, center and right ports of the bridge. In the preferred embodiment, if bit 7 is set, the packet leaves the current node through the left port, and if bit 5 is set, the packet leaves the current node through the right port. If bit 6 is set, the packet enters the node across the center port of the bridge and into the node receiver, which deposits it in the I/O RAM. Any combination of the 3 bits can be set to exit the packet into a node and to simultaneously repeat the same packet back out to another node through one or both of the external bridge ports. Broadcast transfers require the packet header to hold one BCAST rx_opcode for each node that the packet is designed to encounter, in the same order the nodes are encountered. The leading BCAST rx_cntrl is discarded after each intermediate node. Then next BCAST rx_cntrl becomes the active header to lead the packet to the next intermediate node. This is in contrast to the point-to-point transfers, wherein a single PTP rx_cntrl is used by all intermediate nodes on the way to the destination.

The scope of pure point-to-point and broadcast transfers is limited to a single communications cell with up to 32 processors. The datapipe also supports communications across cells with the CELL rx_opcode 1120. Inside each cell, the CELL rx_opcode leads packets to a designated destination on a cell boundary, across all encountered intermediate nodes, just like the PTP opcode, until it gets to the boundary destination. At the boundary node, instead being absorbed into the node, the current CELL rx_opcode is stripped off and a data byte that follows it becomes the new CELL rx_opcode that will guide it to the boundary of the next CELL. After crossing the last CELL boundary, the stripped CELL rx_opcode is replaced with either the PTP or BCAST rx_opcode to guide the packet to its final destination within the last cell, just like a local packet that started out as a point-to-point or a broadcast packet.

The EVENT rx_opcode 1140 sets off stream events inside the datapipe transmitter or the receiver. A transmit stream event takes place when the transmitter recognizes the EVENT rx_cntrl as it is being injected into the datapipe network, typically on the heels of an outgoing packet. The two lower bits of the 5-bit EVT field are then copied by the transmitter to two corresponding interrupt flag bits inside the datapipe interrupt flag register. Those bits, if enabled, could signal the source CPU that a certain packet has just cleared the pins on the way to the destination. Similarly, the EVENT rx_opcode may also be recognized by receiver 102 of the destination node, which copies the upper three bits of the EVT field to the corresponding three interrupt flag bits inside the datapipe interrupt flag register, which if enabled, could alert the destination CPU that a certain packet has just been deposited inside the local I/O RAM.

The INERT (null) rx_opcode 1150 is used by transmitter 101 to pad packet tails when packing the internal 8-bit stream elements into the 16-bit external streams. It is important to push the packet tails out with a null rx_opcode, because all sarbitration inside the bridge takes place on packet boundaries, and another packet contending for the same output port may be held up until the first one clears the port it in its entirety including the tail EVENT rx_opcode used by the arbiter to delineate between packets. This opcode is transparent to all applications and does not require any attention from the user. It eventually stripped of when the packet arrives at its packet.

Figure 12:
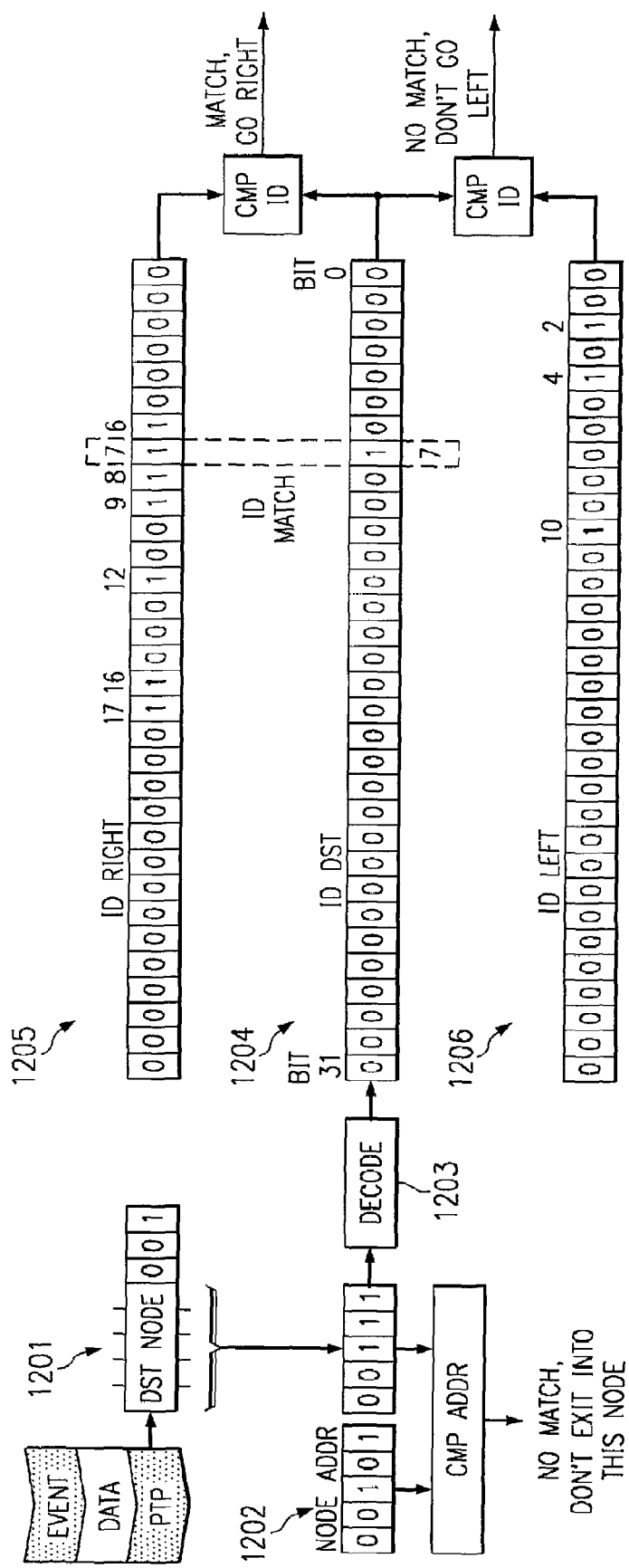
FIG. 12 illustrates routing hardware inside the datapipe bridge.

FIG. 12 illustrates routing hardware inside the datapipe bridge. Each node digital signal processor uses transmitter 101 to inject packets into the network, and receiver 102 to push the arriving packets into its local I/O RAM 105. After each packet header enters bridge 103 through the left or right ports, bridge 103 evaluates its header and processes the destination information inside the header with the resident left and right ID (inter-node direction) registers to route the packet out of bridge 103 toward the packet destination. Bridge 103 has three output ports, left, right and center. Depending on the outcome of the header processing, the point-to-point and cell packets may be routed out bridge 103 through the left, right or center port. Broadcast packets can exit bridge 103 into the node through the center port and at the same time can also be repeated out to other nodes through the left and/or right ports. Each bridge 103 uses three registers, three comparators and one decoder to route the packet to one or more of its three output ports. As each packet header enters the bridge, its 5-bit DST_NODE field 1201 is compared with the 5-bit resident NODE_ADDR 1202 to evaluate the center match. A center match condition allows a packet to enter the node through the center port. The 5-bit DST_NODE may also be decoded via decoder 1203 into a 32-bit ID_DST value 1204 which is then compared with the ID_RIGHT register 1205 and ID_LEFT register 1206 to evaluate the right and left match conditions. The 32 bits of the ID_DST value 1204 represent 32 digital signal processor nodes (numbered from 0 to 31) that comprise a single communications cell. A packet traveling to the digital signal processor node 7 will be represented by the DST_NODE value of 07 hex and the ID_DST value 1204 of 80 hex (bit 7 is high and all other bits are low). The ID_LEFT register 1206 may have a value of 414 hex. This value means that in order to reach digital signal processor nodes 2, 4 and 10 (inside the local cell), the packet should be routed out of the left port of that bridge 103. The ID_RIGHT register 1205 value of 313C0 hex implies that the shortest path to digital signal processor nodes 6, 7, 8, 9, 12, 16 and 17 is through the right port of that bridge 103. In the example of FIG. 12, the OR-ed bit-wise AND function of the packet destination ID_DEST value 1204 with the bridge direction register ID_RIGHT 1205 yields a match and with the bridge direction register ID_LEFT 1206 yields a miss-match. This causes the packet to be routed out through the right port of bridge 103 and not routed out through the left port of bridge 130. Depending on the type of the packet that is passing through the bridge (PTP, BCAST or CELL) the comparator results may be processed in different ways to make the routing decisions compatible with those packet types.

Figure 13:
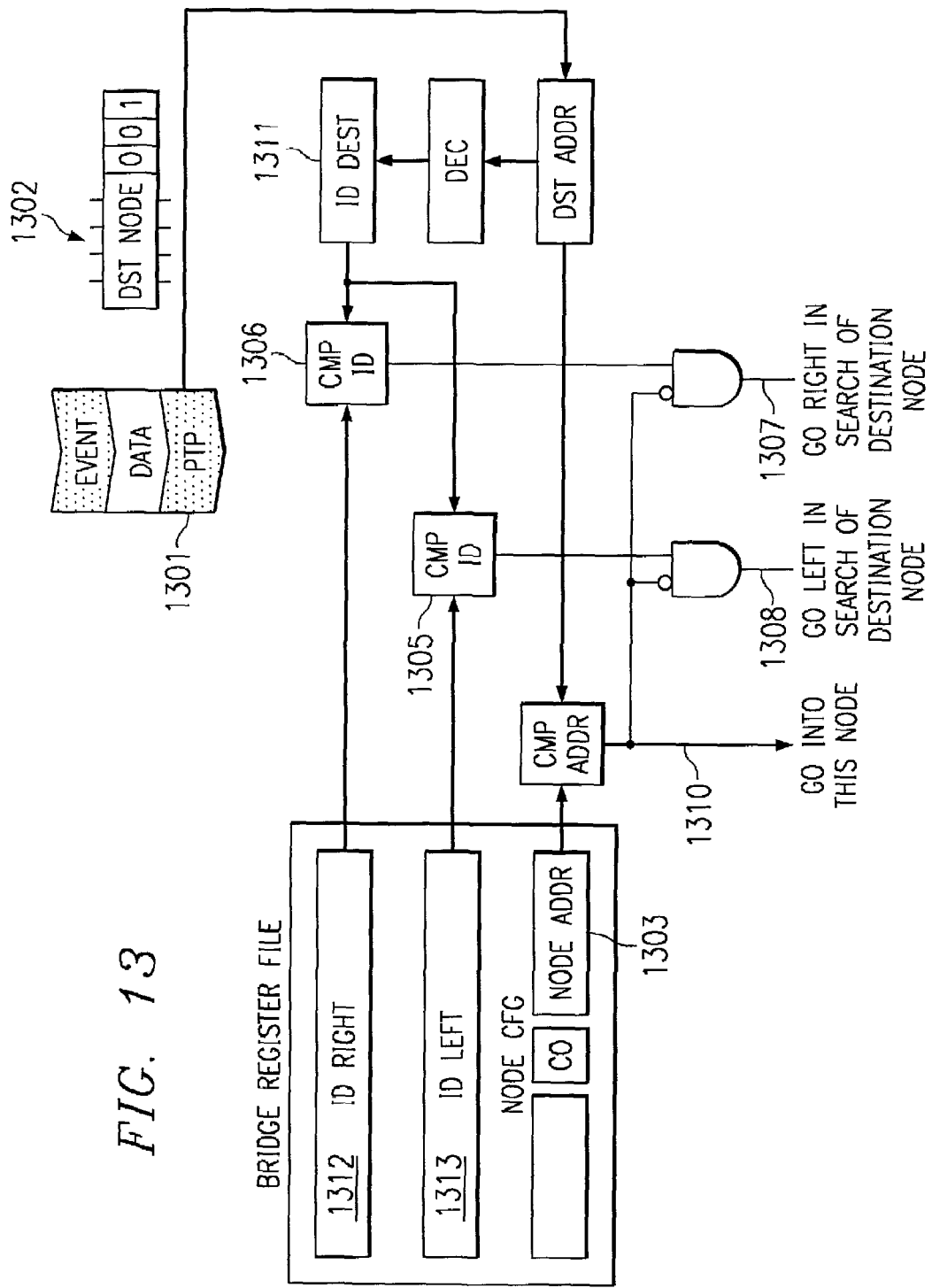
FIG. 13 illustrates point-to-point packet routing protocol.

FIG. 13 illustrates point-to-point packet routing protocol. A point-to-point packet is identified by a PTP rx_opcode 1301 in its header. As the header enters the bridge component at a local node, the DST_NODE field 1302 inside the PTP rx_opcode 1301 is compared the 5-bit NODE_ADDR field of the bridge NODE_CFG Register 1303. A successful address match 1310 causes the packet to enter this local node through the bridge internal center port, across the receiver and into the active channel block of the local I/O RAM. A negative address match triggers the left port ID comparator 1305 and right port ID comparator 1306 that compare the decoded value of the DST_NODE field 1302 against the two 32-bit resident direction registers, ID_RIGHT 1312 and ID_LEFT 1313. A successful right match at right port ID comparator 1306 causes the packet to be routed out of bridge 103 through the right port 1307 to another node in the network. A successful left match at left port ID comparator 1305 causes the packet to be routed out of bridge 103 through left port 1305 to another node on the network. Left port ID comparator 1305 and right port ID comparator 1306 form a bitwise AND. A logical "1" in any bit location indicates a successful match.

Figure 14:
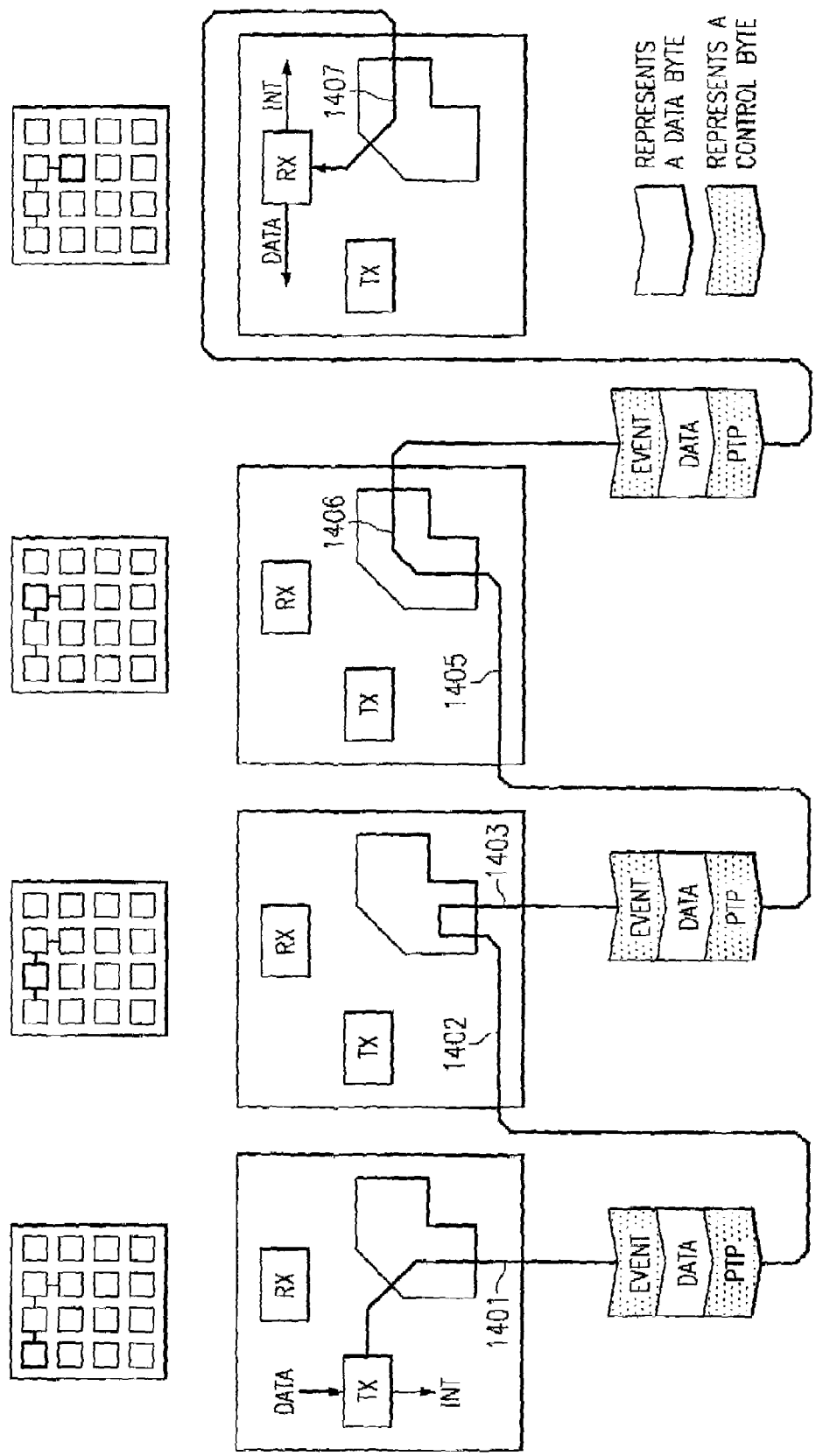
FIG. 14 illustrates an example of point to point packet routing.

FIG. 14 illustrates an example of point to point packet routing. A system level example of a point-to-point transfer on a 16-digital signal processor circuit board may, for each digital signal processor, have the left bridge port assigned to a horizontal communications channel, and each right bridge may connect to a vertical communications channel. Starting with the source digital signal processor, the transmitter (driven by tx_opcodes from a tx_script) drives the packet out of the device through the left port 1401 of its local datapipe bridge. Upon its arrival at the next digital signal processor stop across a horizontal link, the packet header is evaluated inside the bridge 1402 of that device, and the comparison result drives the packet back out of the same left port 1403 to the next node, also in the horizontal direction. The packet header evaluation inside the next bridge component 1405 results in a right match, and the packet is routed across the bridge to the right port 1406 out to the next node, this time in the vertical direction. Inside the next node, the comparison of the address inside the packet header with the node address of the local node yields a successful match 1407. This causes the bridge to route the packet out of its center port and into the receiver. The receiver then strips off the rx_opcodes from the packet and pushes the data content into the active block (channel) inside the local I/O.

Figure 15:
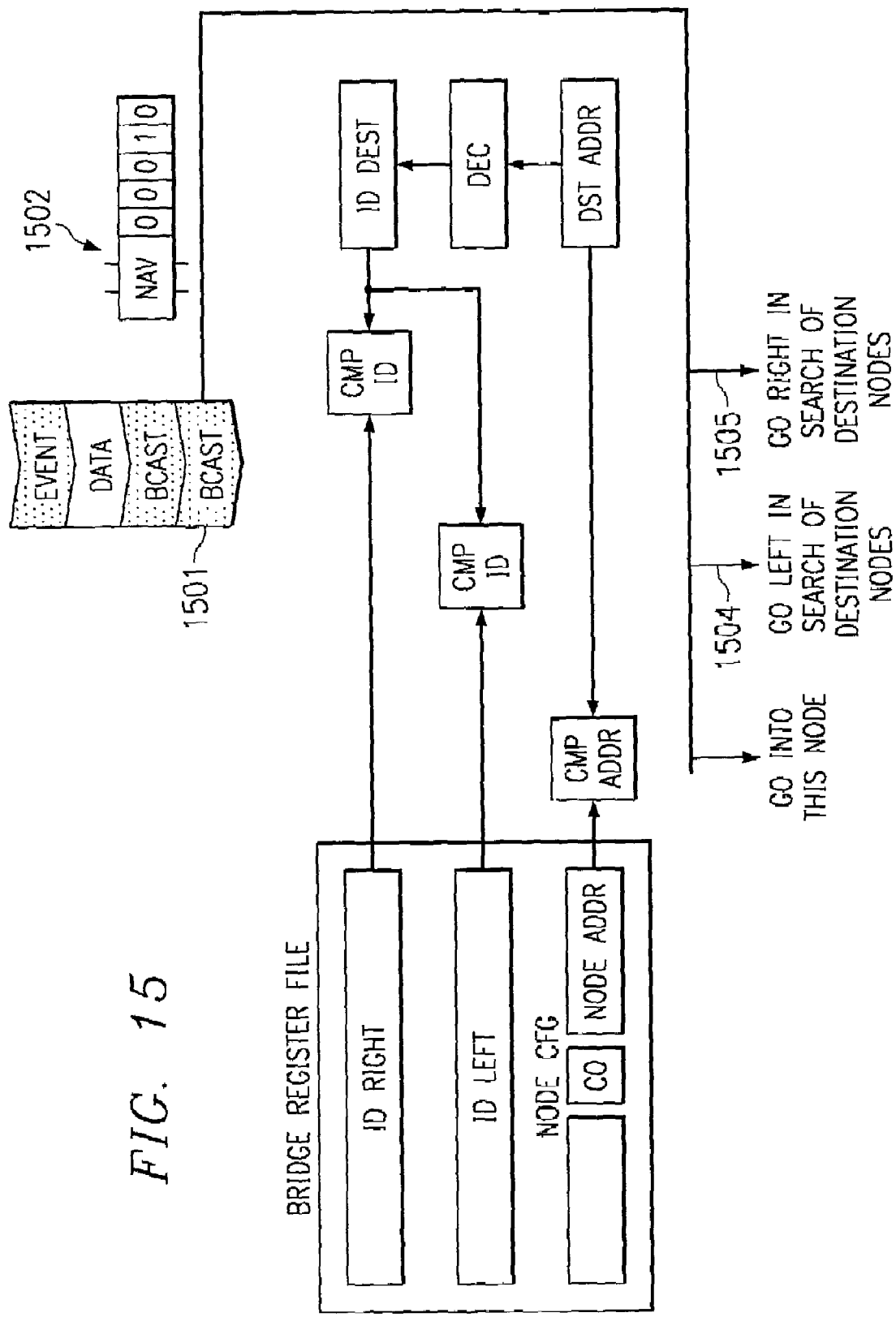
FIG. 15 illustrates broadcast packet routing protocol.

FIG. 15 illustrates broadcast packet routing protocol. A broadcast packet is identified by a BCAST rx_opcode 1501 in its header. As the header enters the bridge component at a local node, the 3-bit NAV field 1502 inside the BCAST rx_opcode is evaluated to determine the port(s) through which the packet is going to leave the bridge. A value of logical 1 in the middle NAV bit causes the packet to enter this local node through the internal center port of the bridge, across the receiver and into the active channel block of the local I/O RAM. A value of logical 1 in the left bit of NAV field 1502 causes the packet to be routed out of the bridge through the left port 1504 another node on the network. Similarly, a logical 1 in the left bit of NAV field 1502 causes the packet to be routed out of the bridge through the right port 1505 another node on the network. Any combination of bits can be turned on inside NAV field 1502, making it possible for the same data packet to both enter the node and be also routed out of the bridge through either left, right or both ports. Each BCAST rx_opcode is only used once per each intermediate node. After entering each node, the spent BCAST rx_opcodes are popped off the packet header and BCAST rx_opcode immediately behind it is used to navigate the packet through the next link on the datapipe network. As shown in FIG. 15, the other bridge hardware is not used for broadcast packets.

Figure 16:
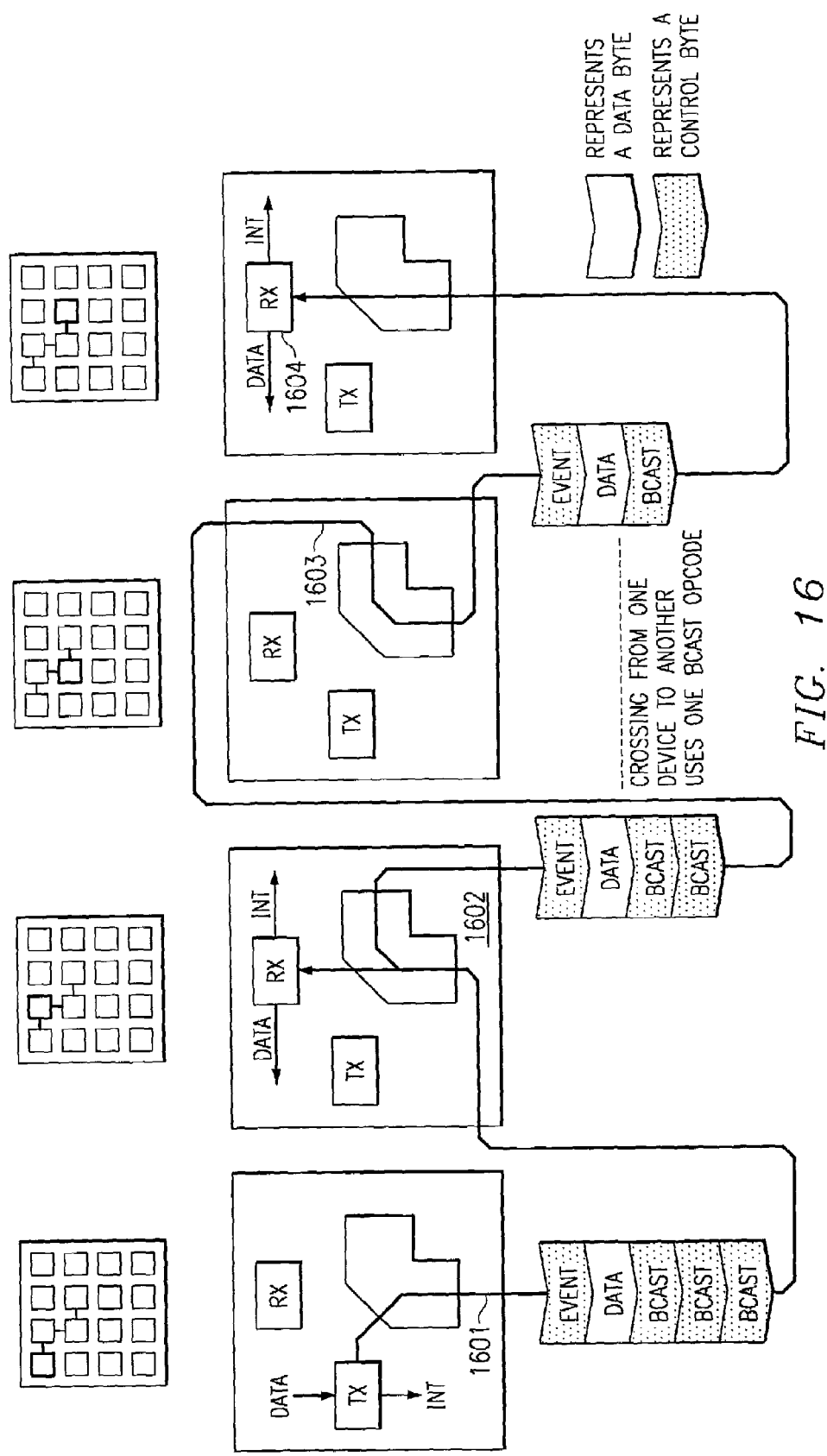
FIG. 16 illustrates an example of broadcast packet routing.

FIG. 16 illustrates an example of broadcast packet routing. A system level example of a broadcast transfer on a 16-digital signal processor circuit board may, for each digital signal processor, have the left bridge port assigned to a horizontal communications channel, and each right bridge may connect to a vertical communications channel. Starting with the source digital signal processor, the transmitter (driven by tx_opcodes from a tx_script) drives the packet out of the device through the left port 1601 of its local datapipe bridge. Upon its arrival at the next digital signal processor 1602 across a horizontal link, the 3-bit NAV field inside the BCAST header is evaluated. A logical 1 in both the right and center bits of the NAV field causes the packet to enter the local node terminal (digital signal processor I/O RAM). At the same time the NAV field routes the packet out the right port, this time in the vertical direction, to the next node on the network 1603. The spent BCAST rx_opcode is discarded and the one immediately behind it is used to navigate the packet through the next bridge junction. A 100 binary NAV field of the second BCAST rx_opcode results in only a left match, and the packet passes across the bridge to the left port and out to the next node, in the horizontal direction. The spent BCAST byte is once again discarded and then replaced by the one immediately behind it in the header. Inside the bridge of the next node, a 010 binary NAV field of the current BCAST rx_opcode causes the packet to enter into the node through the local receiver 1604, which strips off the rx_opcodes from the packet and pushes the pure data content into the active block (channel) inside the local I/O RAM. Under rx_opcode control, the receiver may also send an event to the CPU interrupt selector to notify the CPU that another packet has just been deposited into the local IO_RAM.

Figure 17:
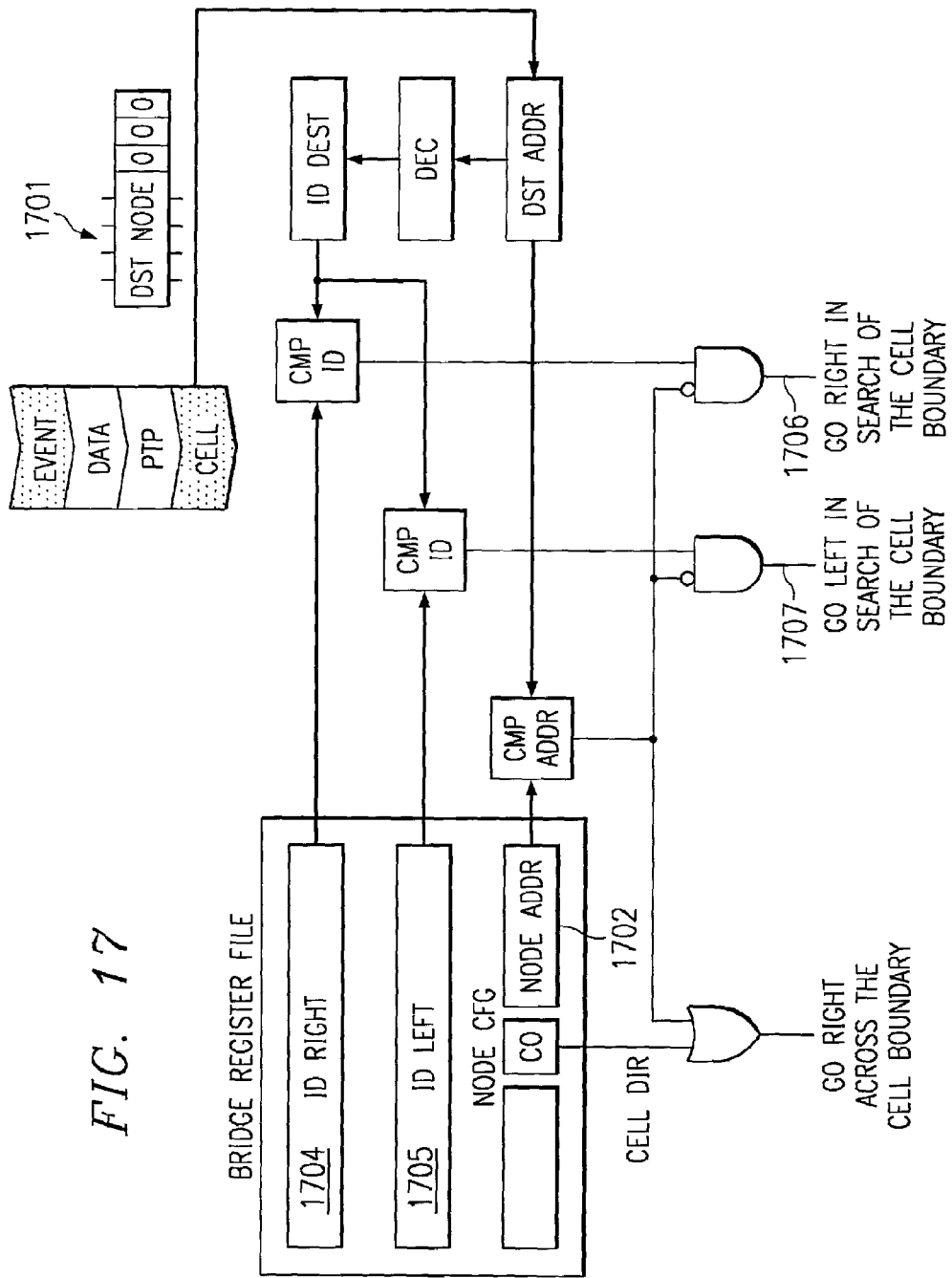
FIG. 17 illustrates inter-cell packet routing protocol.

FIG. 17 illustrates inter-cell packet routing protocol. A cell packet is identified by a CELL rx_opcode in its header. The purpose of the CELL header is to lead the packet across an intermediate cell to a node on that cells boundary and then to cross the boundary in search of the destination node inside a destination cell. As the header enters the bridge component at a local node, the DST_NODE field 1701 inside the PTP rx_opcode is compared the 5-bit NODE_ADDR field 1702 of the bridge NODE_CFG register. A successful address match indicating arrival at the cell boundary, causes the CELL packet to be stripped off, promoting the next byte to an rx_opcode that will guide the packet inside the next cell. Next, the one-bit cell override (CO) field of the resident NODE_CFG register is referenced to find out if a positive match is needed between the NODE_ADDR and the DSP_NODE in order to cross the cell boundary. In the preferred embodiment, a low CO value will cause the packet to enter the next cell by exiting out of the right port only if the match is successful, while a high value of the CO bit routes a cell packet out of the right port even if the match is not successful. Packets always cross cell boundaries through the right port. Left port is never used to cross between cells. The high CO bit is used in tree communications topologies to simultaneously send data to multiple daughter cards from an active motherboard.

Figure 18:
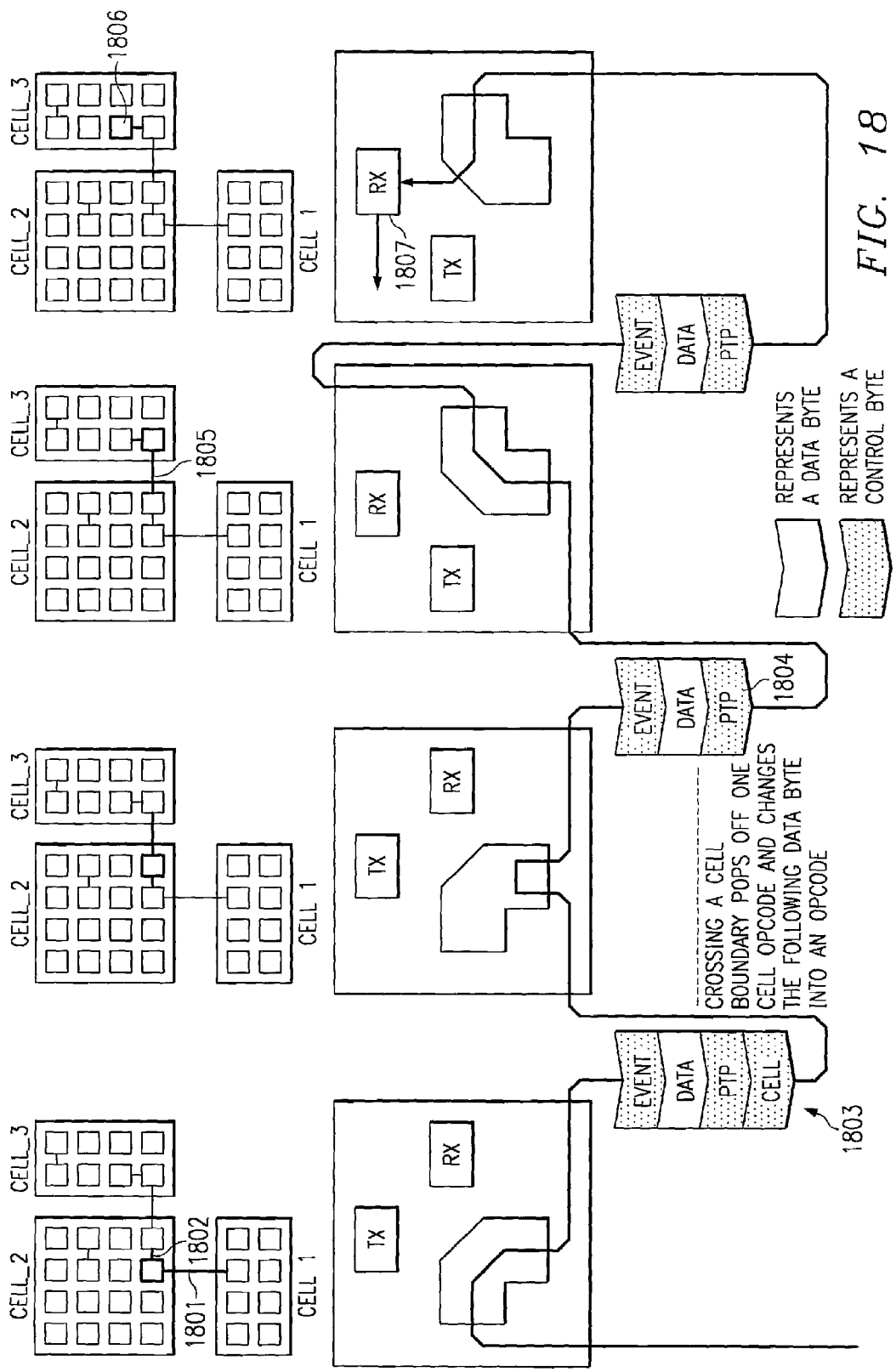
FIG. 18 illustrates an example of inter-cell packet routing.

An unsuccessful cell boundary address match, with a CO bit set to 0, triggers the left and right port ID comparators that match the decoded value of the DST_NODE against the two 32-bit resident direction registers, ID_RIGHT register 1704 and ID_LEFT register 1705. A successful right match causes the packet to be routed out of the bridge through the right port 1706 to another node inside the current cell, in search of the cell boundary to cross over towards the final destination cell. A successful left match causes the packet to be routed out of the bridge through the left port 1707 to another node inside the current cell FIG. 18 illustrates an example of inter-cell packet routing. A system level example of a cell transfer across three 16-DSP circuit boards, arranged in three cells, may result in a packet crossing two cell boundaries before its arrival at the destination node. Starting with the source digital signal processor located on the Cell_1 boundary, the transmitter (driven by tx_opcodes from a tx_script) drives the packet 1801 out of the device across the cell boundary from Cell_1 to Cell_2. After its arrival at the first digital signal processor stop in Cell_2, the packet header is evaluated inside the bridge of that device, and the comparison result drives the packet out of the right port 1802 to the next node in Cell_2. Inside the next node, the comparison of the address inside the packet header with the node address of the local node yields a successful match. This causes the bridge to strip the current CELL rx_opcode from the packet header 1803 and to replace it with the following PTP header 1804. The PTP header 1804, which initially was treated as a data byte immediately following the CELL rx_opcode, is elevated from data status to rx_cntrl status by the output port driving the rx_cntrl signal for that byte high. This bridge routes the packet out of its right port, across the next cell boundary from Cell_2 to Cell_3, and into the first node 1805 in Cell_3. The point-to-point packet header evaluation inside the next bridge component results in a right match, and the packet is once again routed across the bridge to the right port, and out to the next node 1806 in Cell_3.

Inside the next node, the comparison of the address inside the packet header with the node address of the local node yields a successful match. This causes the bridge to route the point-to-point packet out of its center port and into the receiver 1807, which strips off the rx_opcodes from the packet and pushes the data content into the active channel inside the local I/O RAM.

The operation of the three datapipe components, the transmitter, bridge and the receiver, is fully programmable through embedded control registers. The five transmitter registers, three bridge registers and four receiver registers can be loaded at any time during initialization or functional operation. These registers all include 32 bits. Transmitter registers are loaded directly out of the current tx_script, the bridge and receiver register initialization data is embedded in the transfer packets.

Figure 19:
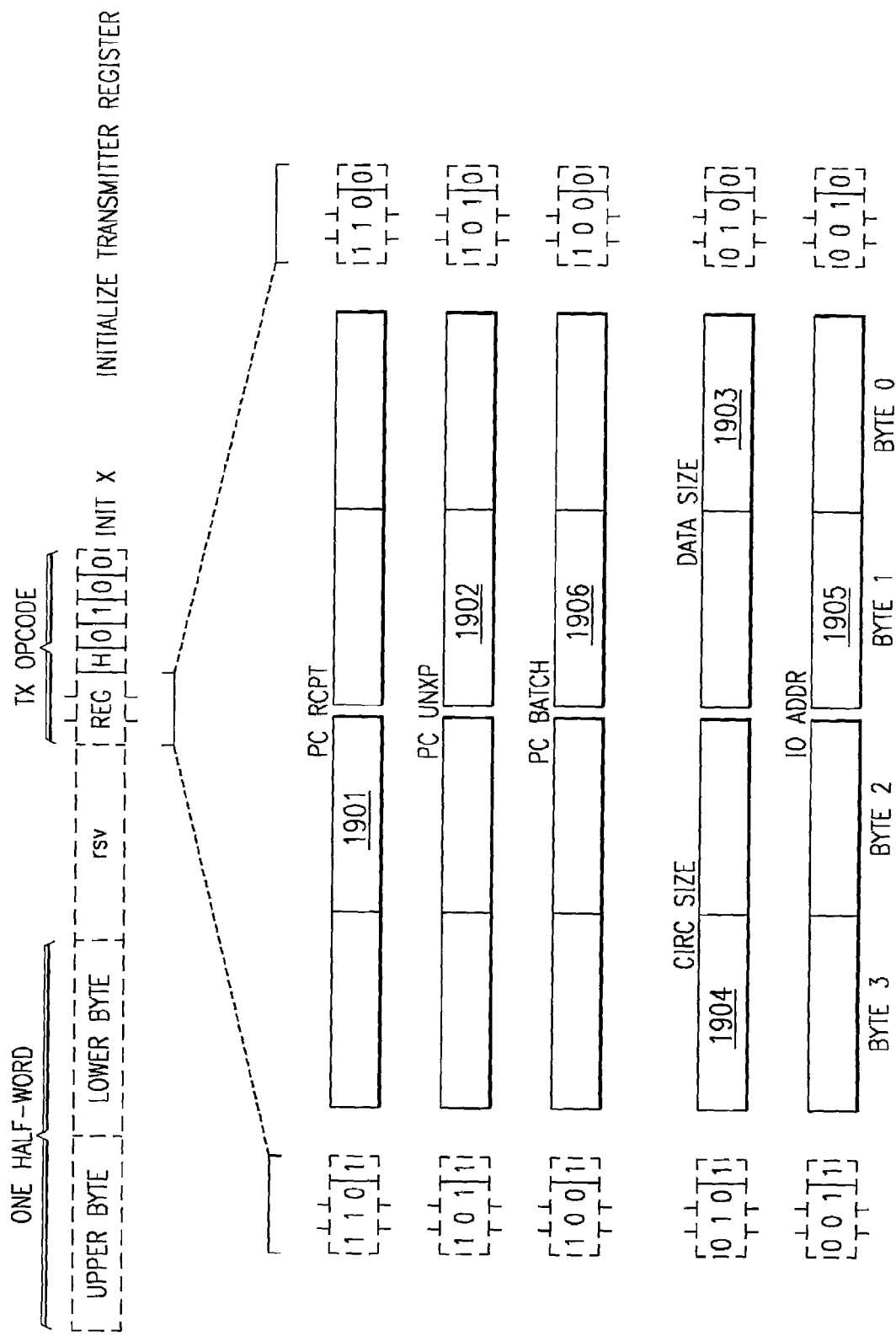
FIG. 19 illustrates the transmitter control registers fields.

FIG. 19 illustrates the fields of the transmitter control registers. The five 32-bit transmitter registers are loaded by the transmitter executing INITX tx_opcodes from the active tx_script. Immediately after reset, the PC_RCPT transfer counter 1901, pointing to the start of the low I/O RAM, starts executing the INITX tx_opcodes to load the rest of the transmitter registers. The REG field of each INITX rx_cntrl identifies the transmitter register, and the H bit identifies which register half-word to load from the high 2 bytes embedded inside the INITX rx_cntrl. A logical 1 value of the H bit loads the upper half-word and a logical 0 value of the H bit loads the lower half-word of a 32-bit transmitter register. The three PC (program counter) registers hold the addresses of the active expected batch tx_script (PC BATCH 1906) and the two unexpected tx_scripts, the unexpected transfer tx_script (PC UNXP register 1902) and the transfer receipt rx_script (PC_RCPT register 1901). The IO_ADDR register 1905 holds the address of the next word to be transmitted from the currently active transmit data block in I/O RAM. The DATA_SIZE field 1903 of the SIZE register represents the length of the active transmit block being transmitted. The CIRC_SIZE field 1904 of the SIZE register holds the size of the two Unexpected transfer tx_script circular buffers (pointed to by the PC_RCPT 1901 and PC_UNXP 1902 program counters).

Figure 20:
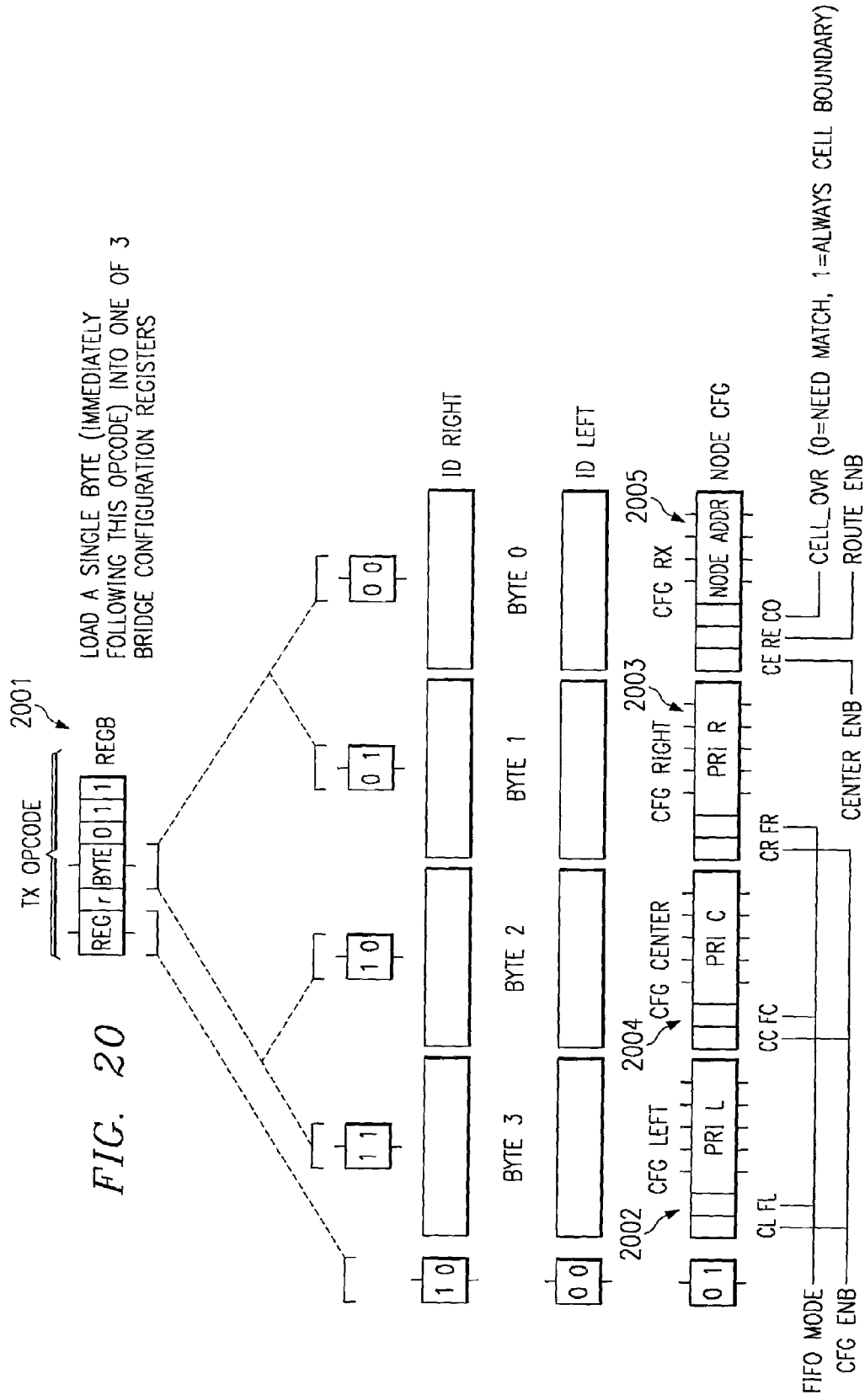
FIG. 20 illustrates the bridge control register $tx_{13}$ opcode fields.

FIG. 20 illustrates the bridge control register rx_cntrl fields. The three 32-bit bridge registers are programmed one byte at a time by the REGB 2001 rx_opcode embedded inside a transfer packet arriving at the bridge. The bridge matches the bits inside two ID registers to the destination address inside each packet header, to route the packets through each intermediate node along the indicated path from source to destination.

The 5-bit NODE_ADDR field is matched against the DST_NODE field from the packet header to determine if the packet should enter this node or to be routed out of the bridge to another node. The one-bit cell override (CO) field of CFG_RX byte is referenced to find out if a positive match is needed between the NODE_ADDR and the DSP_NODE in order to cross the cell boundary. A low CO value will cause the packet to enter the next cell by exiting out of the right port only if the match is successful, while a high value of the CO bit routes a cell packet out of the right port even if the match is not successful. Packets always cross cell boundaries through the right port. Left port is never used to cross between cells. The high CO bit is used in tree communications topologies to simultaneously send data to multiple daughter cards from an active motherboard. This bit is ignored by all nodes that are not in direct contact with the cell boundary. The ROUTE_ENB bit, if logical 0, prevents any data packets from crossing the bridge. This feature is used to prevent any traffic through the bridge before the bridge is initialized. The CENTER_ENB bit, if logical 0, causes the bridge to absorb all packets destined for the center port, while allowing the packet that are passing through the bridge to still be routed out of the bridge through the left or right ports. This feature is used to disconnect the local node from the datapipe network, without affecting the other nodes on the network.

The CFG_LEFT field 2002, CFG_RIGHT field 2003 and CFG_CENTER field 2004 separately configure the three bridge port input and output channels. Each output channel of each port can receive data packets from any of the three input channels. The 6-bit PRI field of each port configuration byte is used to configure the output port arbiter for one of ten possible priority settings for the three sources of data packets. The priority can be fixed in any order with each source having a different priority or one or more sources having the same priority. The case when all three sources have the same priority represents a round-robin arbitration. The minimum switching time between data streams is six cycles. The FIFO_MODE bit of each configuration field, if a logical 1, configures the corresponding port input channel to directly master the output side of an external FIFO instead of being a slave responding to the transmit channel master. The CFG_ENB bit of each configuration field, if logical 0, prevents the corresponding port from writing to the bridge configuration registers. This feature is used to prevent accidental reconfiguration of the bridge by an errant data stream.

Figure 21:
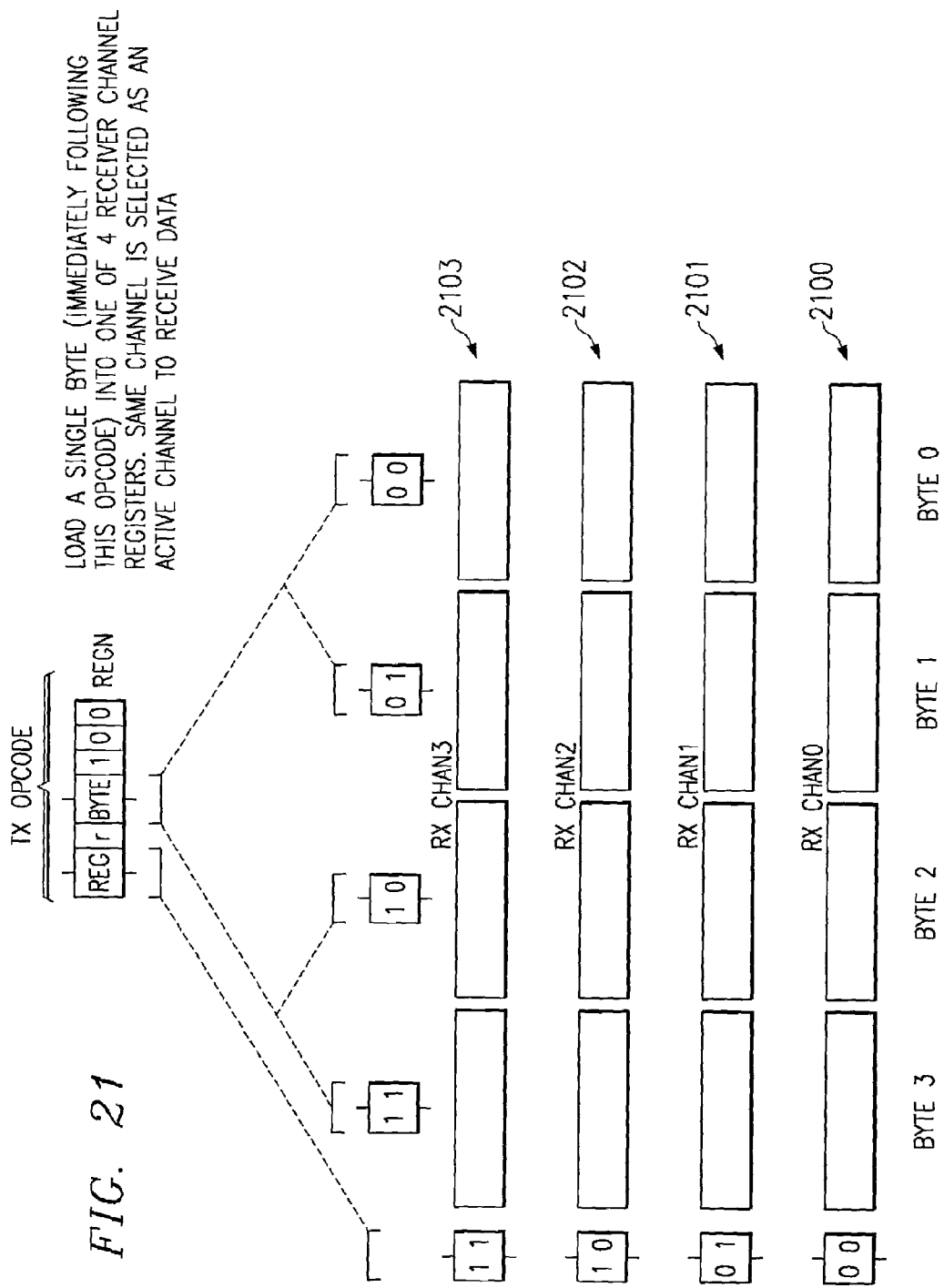
FIG. 21 illustrates the receiver control register tx_opcode fields.

FIG. 21 illustrates the receiver control register rx_cntrl fields. The four 32-bit receiver registers are programmed one byte at a time by the REGN rx_opcode embedded inside a transfer packet arriving at the bridge. Each REGN rx_opcode loads one byte, immediately following the REGN rx_opcode, to one receiver register byte location. The BYTE field of the REGN rx_opcode identifies one of the four bytes, while the REG field identifies one of the four registers. These four registers are RX_CHAN0 register 2100, RX_CHAN1 register 2101, RX_CHAN2 register 2102 and RX_CHAN3 register 2103.

The RX_CHAN registers hold the current addresses of four separate regions within the I/O RAM where the receiver can directly deposit incoming data packets. Only one channel can be active at any one time. The active channel is selected with the CHAN rx_opcode inside the packet header, prior to the data arriving at the receiver.

Figure 22:
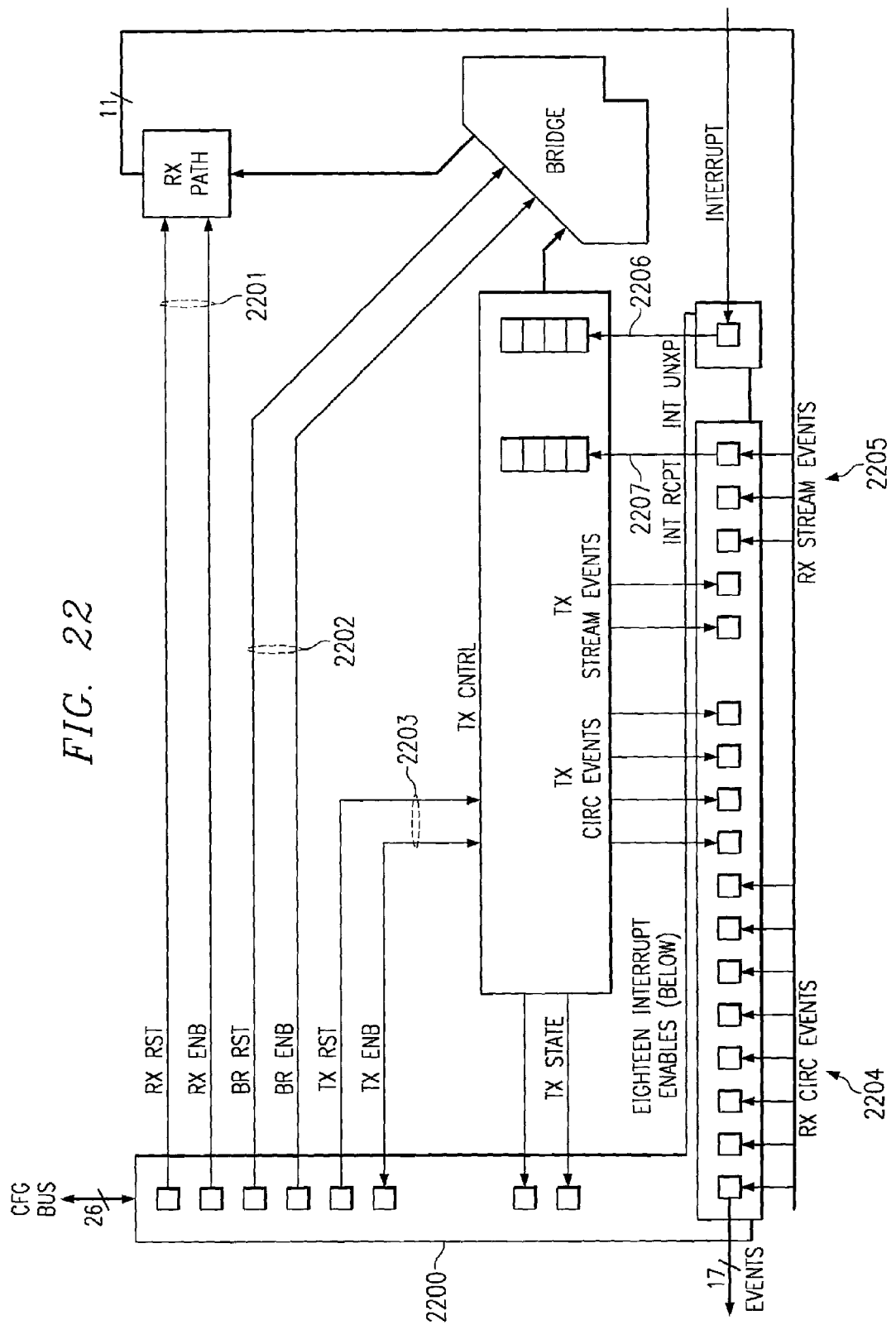
FIG. 22 illustrates datapipe events, interrupts and configuration bits.

FIG. 22 illustrates datapipe events, interrupts and configuration bits. Configuration of the datapipe is accomplished through a 27-bit CFG_BUS, which includes six inputs of reset and enable functions routed to the receiver, bridge, and transmitter, respectively. These are labeled 2201, 2202, and 2203 in FIG. 22. A total of twenty-one monitor signals are routed back into the CFG_BUS 2200 I/O. These twenty one signals are: (a) two inputs from the transmitter labeled TX_STATE; and (b) seventeen event signals including TX_CIRC events (4), TX_STREAM events (2), RX_CIRC events (8), RX_STREAM events (3) and (c) two interrupt signals INT_UNEXP and INT_TOUT. The two interrupt signals INT_UNEXP and IN_TOUT are also monitored.

The above illustrates the controllability aspects of the datapipe. The registers on FIG. 22 contain enough event bits and control bits for the digital signal processor to take full advantage of all datapipe features with minimum latency. In addition to controllability, the datapipe also includes programmable flexibility to drive packets out of or into nodes. Other capability built into the bridge allows it to autonomously navigate through the sea of digital signal processors. This can be characterized as two levels of programmable configurability.

Level 1: The transmitter is programmed with tx_opcodes to actively drive the communication grid with a predefined approach repeated during each processing frame or to drive the grid via unexpected packets much like a microprocessor is programmed to process data. Also the receiver may be programmed with rx_opcodes to actively receive packets into designated buffers, turn them around back to the source or pull other data from the destination node back to the source node. Datapipe mastering of transmission and reception operations is different from conventional methods where the CPU and DMA drive the data in and out and the communication peripheral is just a slave responding to their actions.

Level 2: In addition to controlling the receiver, some of the rx_opcodes embedded in each packet actively PROGRAM each bridge they encounter to configure it for that packet. The programmable bridge element of the datapipe is programmed by each packet (rx_opcodes) to take different actions in response to matching of the routing information contained in the packet and bridge. This is different from conventional methods where the routing bridges are hard-wired and not subject to programmable reconfigurability by the packet to route the packet in different ways depending on what type of the packet is being processed. These configuration control and monitor signals enable the effective configuration of a datapipe through the use of normal rx_cntrl operations. Access to the transmitter, bridge, and receiver control registers through the tx_opcodes provides for the completion of the configuration process.

FIG. 22 illustrates datapipe events, interrupts and configuration bits concerned with datapipe configuration. The datapipe configuration/status register 2200 contains separate reset and enable control/status bits for each of the three datapipe components, receiver, bridge and transmitter. Each of the three modules can be independently reset and can also be independently disabled and enabled 2201, 2202, 2203 without loss of data. All configuration/status register bits are typically written to and read by the CPU. However the TX_ENB bit can be unasserted by the transmitter after executing the HALT rx_cntrl. The two TX_STATE bits are always set by the transmitter, and reflect the current state of the transmitter. A value of 11 binary represents the transmitter traversing the batch script, 01 binary represents the transmitter traversing the unexpected transfer script and 10 binary represents the transmitter traversing the receipt confirmation script.

The internal datapipe interrupt flag register delivers seventeen datapipe events to the chip interrupt selectors and receives two interrupts driving the datapipe transmitter and one interrupt driving the bridge. The INT_UNXP 2206 interrupt, if enabled, causes the transmitter to temporarily suspend batch transfers and to start processing the unexpected transfer script. The INT_RCPT 2207 interrupt, if enabled, causes the transmitter to temporarily suspend batch transfer and to start processing the transfer receipt script. The INT_TOUT interrupt represents a timer time out condition. The eleven datapipe events are composed of eleven events from the receiver (eight circular events 2204 and three stream events 2205) and six transmitter events (four circular events and two stream events). All seventeen datapipe interrupt flags are mirrored by corresponding interrupt enable bits in the datapipe interrupt enable register. The seventeen datapipe interrupt flag have a persistence of one clock pulse period.

Figure 23:
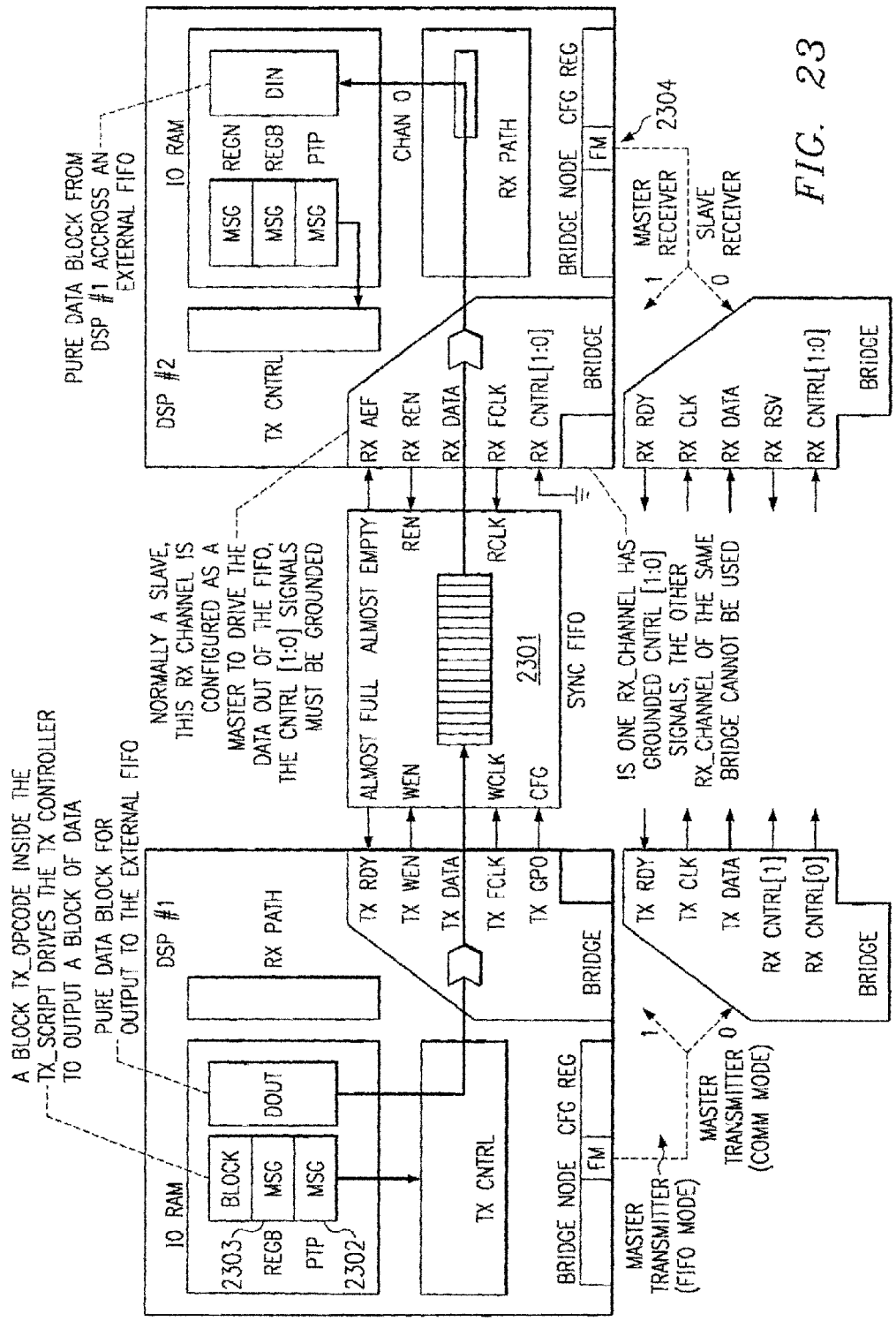
FIG. 23 illustrates the connection to external FIFOs without additional external glue logic.

FIG. 23 illustrates the connection to external FIFOs without additional external glue logic. In addition to connecting to other nodes, the two external ports of the datapipe bridge can also interface external synchronous FIFOs and host processors. The connection to external FIFOs without additional external hardware is possible because the bridge port transmit channel has been modeled as a master driving the input side of a FIFO.

The receive channel, while normally a slave to the transmitter master, can be also configured as a master to drive the output side of a FIFO. No external hardware logic is required for this connection. Any host processor parallel interface, that can drive an input side of an external FIFO, can also directly drive data into the receive channel of the bridge. A host processor parallel interface can also read data out of the external FIFO output side to absorb data that the digital signal processor datapipe routing bridge pushed into the FIFO through its input side with the bridge transmit channel.

The datapipe bridge port transmit channel is designed to directly drive pure data into an input side of an external FIFO 2301. Consider an example where the right port writes to a FIFO. Two blocks of data are deposited in the I/O RAM, the block of data to be transmitted out and the tx_script to instruct the transmitter how to transmit the data.

First the MSG rx_cntrl, containing a PTP rx_opcode 2302 with a non-existing address is driven into the bridge center port receiver. Next, other MSG tx_opcodes modify the bridge ID_RIGHT register 2303 (using four REGB rx_opcodes) to include the just used non-existing destination node address. This sets up the right port of the bridge as a current path for all output streams out of this node. The BLOCK rx_cntrl, pointing to a block of pure data in a separate part of I/O_RAM, triggers the transmitter to drive this block out of the node via the current destination path through the right port of the bridge and into the input end of the external FIFO.

For datapipe bridge receive channel to start driving pure data out of an external FIFO, the datapipe has to reconfigure the receive channel (the one connected to the output side of the FIFO) to a FIFO_Mode 2304. This mode converts the receive channel operation from slave to master, driving the output end of the FIFO instead of responding the transmit channel of another node.

Figure 24:
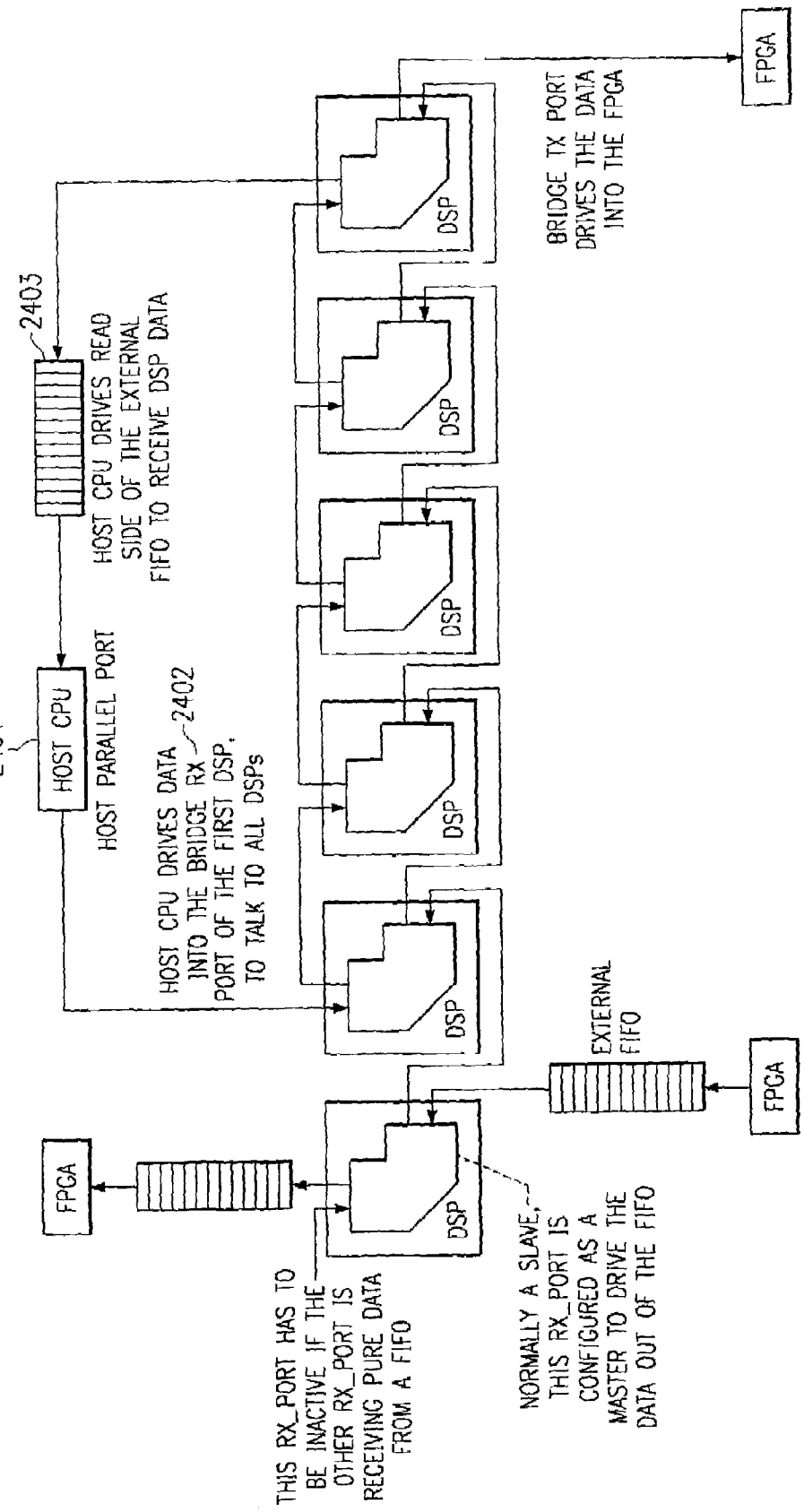
FIG. 24 illustrates the interface of datapipe bridge to host processor.

FIG. 24 illustrates the interface of datapipe bridge to a host processor. Host CPU 2401 can drive any number of digital signal processors by latching on to the datapipe network connecting the digital signal processors. Host CPU 2401 typically uses a parallel port interface to master both the read and write bus cycles. Depending on the host, some external logic may be needed in order to connect it to the datapipe network.

During write operations (from host to DSP), host CPU 2401 drives the receive channel of the digital signal processor 2402, pushing both rx_opcodes and data into the receive channel, exactly the same as datapipe transmit channel would send packets to the receive channel of another node. Depending on the rx_opcodes in packet headers, the packet contents may be deposited in I/O RAM of any digital signal processor on the network, just like in the inter-processor communication operations. This gives the host a direct write visibility to any digital signal processor.

In order to perform read operation (from digital signal processor to host), the host drives the receive channel of the digital signal processor with rx_opcodes requesting the specific digital signal processors to return data back to the host. Each digital signal processor responding to read requests, drives the requested data packets across the datapipe network to a common port back to the host. In order to complete the read operations, the host simply issues read cycles to the external FIFO 2403. Either an external FIFO or external logic must always be used by the host to pull data out of the datapipe routing bridge.

Figure 25:
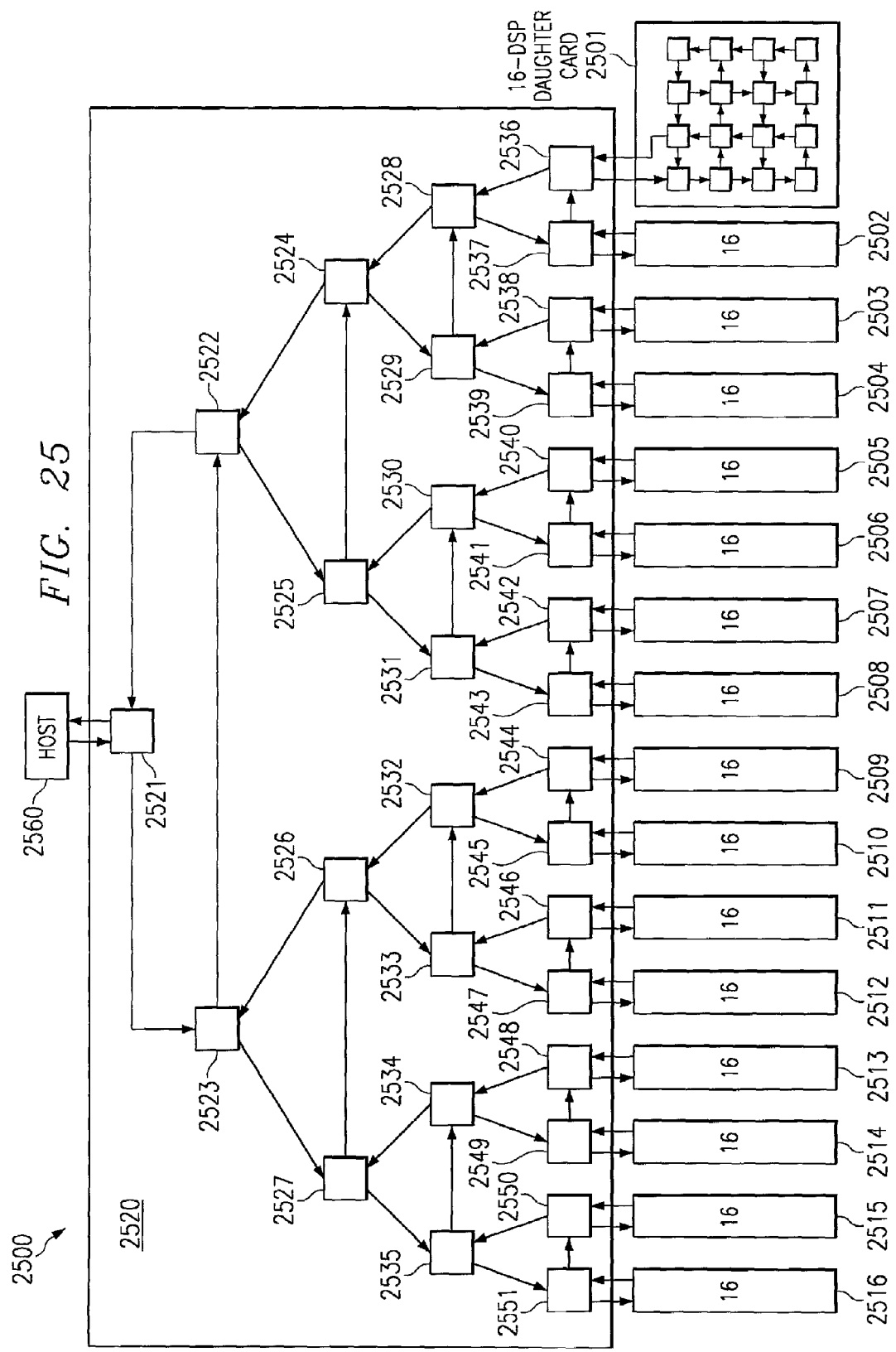
FIG. 25 illustrates an alternate connection technique for connecting plural clusters of nodes.

FIG. 25 illustrates an alternate connection technique for connecting plural clusters of nodes. FIG. 25 illustrates multiprocessor system 2500 including 16 DSP clusters 2501 to 2516. Each of the DSP clusters 2501 to 2516 preferable include 16 DSP/databridge nodes connected in the topology previously illustrated in FIG. 2. These DSP clusters 2501 to 2516 are preferably embodying in separate plug-in daughter cards. Multiprocessor 2500 includes an active backplane 2520 for interconnecting DSP clusters 2501 to 2516 and connecting to host computer 2560. Active backplane 2520 includes 31 DSP/databridge nodes 2521 to 2551 connected in a tree format. Each of the DSP/databridge nodes 2521 to 2551 includes right and left input lines and right and left output lines. DSP/databridge node 2521 is bidirectionally coupled to host computer 2560. DSP/databridge node 2521 is also connected to two lower level DSP/databridge nodes 2522 and 2523. Each of the intermediate nodes is coupled to one higher level node, one peer node and two lower level node. Lastly the lowest level nodes 2536 to 2551 are bidirectionally connected to corresponding DSP clusters 2501 to 2516.

The use of active backplane 2520 reduces the number of intermediate nodes needed to connect distant DSP clusters 2501 to 2516. Without the tree structure, a data packet would need to traverse 16 nodes to travel from DSP cluster 2501 to DSP cluster 2516. The multiprocessor system 2500 requires only 14 nodes to travel from DSP cluster 2516 to DSP cluster 2501: nodes 2551, 2550, 2535, 2534, 2527, 2526, 2523, 2522, 2525, 2524, 2529, 2528, 2537 and 2536. The other direction from DSP cluster 2501 to DSP cluster 2516 requires traversing only 9 nodes; 2536, 2528, 2524, 2522, 2521, 2523, 2527, 2535 and 2551. This reduced path length reduces the latency in data transfer. It also reduces the header lengths for specifying the data transfers. Note further that the interface to host computer 2560 is about equidistant from the DSP clusters 2501 to 2516. Thus the data input path from host computer 2560 and data output path to host computer 2560 is balanced for the DSP clusters 2501 to 2516.

What is claimed is:

1. A data routing unit comprising:
    a data receiver;
    a data transmitter;
    at least one set of data output lines, each of said at least one set of data output lines consists of a plurality of data lines and a data routing unit clock line;
    said data transmitter generating data transmitted on said data output lines synchronous with a transmitter clock signal on said data routing unit clock line;
    a bridge circuit connected to supply data to said data receiver and to receive data from said data transmitter, said bridge circuit connected to at least one set of data input lines and to said at least one set of data output lines, said bridge circuit responsive to a header of a data packet received from said data transmitter or received from said at least one set of data input lines to selectively route said received data packet to (1) said data receiver circuit, (2) a selected set of said at least one set of data output lines, or (3) both said data receiver circuit and a selected set of said at least one set of data output lines dependent upon said header;
    an input/output memory connected to said data receiver for storing data received by said data receiver and to said data transmitter for storing data to be transmitted by said data transmitter; and
    a central processing unit connected said input/output memory for storing data into said input/output memory and reading data from said input/output memory, said central processing unit operating in synchronism with a CPU clock which is asynchronous with said transmitter clock signal.

2. The data routing unit of claim 1, wherein:
    said at least one set of data input lines consists of a right set of data input lines and a left set of data input lines; and
    said at least one set of data output lines consists of a right set of data output lines and a left set of data input lines.

3. A data routing unit comprising:
    a data receiver;
    a data transmitter;
    at least one set of data input lines, each of said at least one set of data input lines consists of a plurality of data lines and a data routing unit clock line;
    said data receiver sensing data received on said data lines synchronous with a transmitter clock signal on said data routing unit clock line;
    a bridge circuit connected to supply data to said data receiver and to receive data from said data transmitter, said bridge circuit connected to said at least one set of data input lines and at least one set of data output lines, said bridge circuit responsive to a header of a data packet received from said data transmitter or received from said at least one set of data input lines to selectively route said received data packet to (1) said data receiver circuit, (2) a selected set of said at least one set of data output lines, or (3) both said data receiver circuit and a selected set of said at least one set of data output lines dependent upon said header;
    an input/output memory connected to said data receiver for storing data received by said data receiver and to said data transmitter for storing data to be transmitted by said data transmitter; and
    a central processing unit connected said input/output memory for storing data into said input/output memory and reading data from said input/output memory, said central processing unit operating in synchronism with a CPU clock which is asynchronous with said transmitter clock signal.

4. The data routing unit of claim 3, wherein:
    said at least one set of data input lines consists of a right set of data input lines and a left set of data input lines; and
    said at least one set of data output lines consists of a right set of data output lines and a left set of data input lines.

5. A data routing unit comprising:
    a data receiver;
    a data transmitter;
    a bridge circuit connected to supply data to said data receiver and to receive data from said data transmitter, said bridge circuit connected to at least one set of data input lines and at least one set of data output lines, said bridge circuit responsive to a header of a data packet received from said data transmitter or received from said at least one set of data input lines to selectively route said received data to (1) said data receiver circuit, (2) a selected set of said at least one data output lines, or (3) both said data receiver circuit and a selected set of said at least one set of data output lines dependent upon said header;

said bridge circuit further includes
a node address register storing a uniquely assigned multibit node address;
a node address comparator connected to said node address register for comparing predetermined destination node address bits of said header with said node address stored in said node address register;
said bridge circuit selectively routing said received data packet to said data receiver when said destination node address bits matches said node address;
a plurality of routing registers, each routing register corresponding to one set of data output lines, each routing register storing an indication of a set of node addresses;
a plurality of routing comparators, each routing comparator connected to a corresponding routing register for comparing predetermined destination node address bits of said header with said indication of as set of node addresses stored in said corresponding routing register; and
said bridge circuit selectively routing said received data packet to a set of data output lines when said destination node address bits matches a node address of said set of node addresses stored in said corresponding routing register.

6. The data routing unit of claim 5, further comprising:
an input/output memory connected to said data receiver for storing data received by said data receiver and to said data transmitter for storing data to be transmitted by said data transmitter.

7. The data routing unit of claim 6, further comprising:
a central processing unit connected said input/output memory for storing data into said input/output memory and reading data from said input/output memory.

8. The data routing unit of claim 5, wherein:
said at least one set of data input lines consists of a right set of data input lines and a left set of data input lines; and
said at least one set of data output lines consists of a right set of data output lines and a left set of data input lines.

9. A data routing unit comprising:
a data receiver;
a data transmitter;
at least one set of data input lines, said at least one set of data input lines consists of a right set of data input lines and a left set of data input lines;
at least one set of data output lines, said at least one set of data output lines consists of a right set of data output lines and a left set of data input lines;
a bridge circuit connected to supply data to said data receiver and to receive data from said data transmitter, said bridge circuit connected to said at least one set of data input lines and said at least one set of data output lines, said bridge circuit responsive to a header of a data packet received from said data transmitter or received from said at least one set of data input lines to selectively route said received data packet to (1) said data receiver circuit, (2) a selected set of said at least one data output lines, or (3) both said data receiver circuit and a selected set of said at least one set of data output lines dependent upon said header;
said bridge circuit further includes
a right routing register storing a right routing data word having a plurality of bits, each bit corresponding to a unique node address and having either a first digital state indicating routing via said right data output lines to reach said unique node address or a second digital state indicating not routing via said right data output lines to reach said unique node address;
a left routing register storing a left routing data word having a plurality of bits, each bit corresponding to a unique node address and having either a first digital state indicating routing via said left data output lines to reach said unique node address or a second digital state indicating not routing via said left data output lines to reach said unique node address;
a decoder receiving said header for converting said destination node address into a multibit destination data word having a bit corresponding to said destination node address in said first digital state and all other bits in said second digital state;
a right comparator connected to said right routing register and said decoder for comparing said right routing data word and said destination data word; and
a left comparator connected to said left routing register and said decoder for comparing said left routing data word and said destination data word; and
said bridge circuit selectively routing said received data packet to said right data output lines when said destination data word matches said right routing data word and selectively routing said received data packet to said left data output lines when said destination data word matches said left routing data word.

10. The data routing unit of claim 9, further comprising:
an input/output memory connected to said data receiver for storing data received by said data receiver and to said data transmitter for storing data to be transmitted by said data transmitter; and
a central processing unit connected said input/output memory for storing data into said input/output memory and reading data from said input/output memory, said central processing unit operable to write data into said right routing register and into said left routing register.

11. The data routing unit of claim 9, further comprising:
an input/output memory connected to said data receiver for storing data received by said data receiver and to said data transmitter for storing data to be transmitted by said data transmitter.

12. The data routing unit of claim 11, further comprising:
a central processing unit connected said input/output memory for storing data into said input/output memory and reading data from said input/output memory.

13. The data routing unit of claim 9, wherein:
said at least one set of data input lines consists of a right set of data input lines and a left set of data input lines; and
said at least one set of data output lines consists of a right set of data output lines and a left set of data input lines.

14. A data routing unit comprising:
a data receiver;
a data transmitter;
at least one set of data input lines, said at least one set of data input lines consists of a right set of data input lines and a left set of data input lines;
at least one set of data output lines, said at least one set of data output lines consists of a right set of data output lines and a left set of data input lines;
a bridge circuit connected to supply data to said data receiver and to receive data from said data transmitter, said bridge circuit connected to said at least one set of data input lines and said at least one set of data output lines, said bridge circuit responsive to a header of a data packet received from said data transmitter or received from said at least one set of data input lines to selectively route said received data packet to (1) said data receiver circuit, (2) a selected set of said at least one data output lines, or (3) both said data receiver circuit and a selected set of said at least one set of data output lines dependent upon said header; and said bridge circuit selectively routing said received data packet to said data receiver when a predetermined central navigation bit of said header has a first digital state, routing said received data packet with said header deleted to said right set of data output line when a predetermined right navigation bit of said header has said first digital state and routing said received data packet with said header deleted to said left set of data output line when a predetermined left navigation bit of said header has said first digital state.

15. The data routing unit of claim 14, further comprising:

an input/output memory connected to said data receiver for storing data received by said data receiver and to said data transmitter for storing data to be transmitted by said data transmitter.

16. The data routing unit of claim 15, further comprising:

a central processing unit connected said input/output memory for storing data into said input/output memory and reading data from said input/output memory.

17. The data routing unit of claim 14, wherein:

said at least one set of data input lines consists of a right set of data input lines and a left set of data input lines; and said at least one set of data output lines consists of a right set of data output lines and a left set of data input lines.

* * * * *